(12) United States Patent
Kenrich et al.

(10) Patent No.: US 7,748,045 B2
(45) Date of Patent: Jun. 29, 2010

(54) METHOD AND SYSTEM FOR PROVIDING CRYPTOGRAPHIC DOCUMENT RETENTION WITH OFF-LINE ACCESS

(76) Inventors: Michael Frederick Kenrich, 335 Beach Dr., Aptos, CA (US) 95003; Yevgeniy Gutnik, 1055 Manet Dr., Apt. 33, Sunnyvale, CA (US) 94087

( * ) Notice: Subject to any disclaimer, the term of this patent is extended or adjusted under 35 U.S.C. 154(b) by 1057 days.

(21) Appl. No.: 10/815,229

(22) Filed: Mar. 30, 2004

(65) Prior Publication Data

US 2005/0223414 A1  Oct. 6, 2005

(51) Int. Cl.
*H04K 1/00* (2006.01)

(52) U.S. Cl. .............................. 726/27; 705/50; 705/51; 705/57; 705/67; 707/8; 707/203; 713/160; 713/165; 713/193; 726/1; 726/2; 726/5; 726/26

(58) Field of Classification Search ................. 713/193, 713/165, 160; 726/27, 26; 709/219, 229; 711/100, 112, 159; 707/8, 203
See application file for complete search history.

(56) References Cited

U.S. PATENT DOCUMENTS

| | | | |
|---|---|---|---|
| 5,204,897 A * | 4/1993 | Wyman ...................... 710/200 |
| 5,235,641 A | 8/1993 | Nozawa et al. |
| 5,535,375 A | 7/1996 | Eshel et al. |
| 5,655,119 A | 8/1997 | Davy |
| 5,661,806 A | 8/1997 | Nevoux et al. |

(Continued)

FOREIGN PATENT DOCUMENTS

EP  0 913 967 A2  5/1999

(Continued)

OTHER PUBLICATIONS

Examination Report, completion date Jun. 18, 2008, for European Patent Application No. EP 02 258 532.7-1244, 6 pgs.

(Continued)

*Primary Examiner*—Nasser Moazzami
*Assistant Examiner*—Shanto M Abedin
(74) *Attorney, Agent, or Firm*—Sterne, Kessler, Goldstein & Fox PLLC

(57) ABSTRACT

Techniques for utilizing security criteria to implement document retention for electronic documents are disclosed. The security criteria can also limit when, how and where access to the electronic documents is permitted. The security criteria can pertain to keys (or ciphers) used to secure (e.g., encrypt) electronic files (namely, electronic documents), or to unsecure (e.g., decrypt) electronic files already secured. At least a portion of the security criteria can be used to implement document retention, namely, a document retention policy. After a secured electronic document has been retained for the duration of the document retention policy, the associated security criteria becomes no longer available, thus preventing subsequent access to the secured electronic document. In other words, access restrictions on electronic documents can be used to prevent access to electronic documents which are no longer to be retained.

21 Claims, 13 Drawing Sheets

U.S. PATENT DOCUMENTS

| | | | |
|---|---|---|---|
| 5,673,316 A | 9/1997 | Auerbach et al. | |
| 5,732,265 A | 3/1998 | Dewitt et al. | |
| 5,790,790 A | 8/1998 | Smith et al. | |
| 5,813,009 A * | 9/1998 | Johnson et al. | 707/100 |
| 5,825,876 A | 10/1998 | Peterson | |
| 5,923,754 A | 7/1999 | Angelo et al. | |
| 5,970,502 A | 10/1999 | Salkewicz et al. | |
| 5,999,907 A | 12/1999 | Donner | |
| 6,014,730 A | 1/2000 | Ohtsu | |
| 6,069,957 A | 5/2000 | Richards | |
| 6,085,323 A | 7/2000 | Shimizu et al. | |
| 6,101,507 A | 8/2000 | Cane et al. | |
| 6,122,630 A | 9/2000 | Strickler et al. | |
| 6,134,660 A | 10/2000 | Boneh et al. | |
| 6,134,664 A | 10/2000 | Walker | |
| 6,192,408 B1 | 2/2001 | Vahalia et al. | |
| 6,212,561 B1 | 4/2001 | Sitaraman et al. | |
| 6,223,285 B1 | 4/2001 | Komuro et al. | |
| 6,226,618 B1 | 5/2001 | Downs et al. | |
| 6,260,040 B1 | 7/2001 | Kauffman et al. | |
| 6,292,895 B1 | 9/2001 | Baltzley | |
| 6,308,273 B1 | 10/2001 | Goertzel et al. | |
| 6,332,025 B2 | 12/2001 | Takahashi et al. | |
| 6,343,316 B1 | 1/2002 | Sakata | |
| 6,349,337 B1 | 2/2002 | Parsons et al. | |
| 6,357,010 B1 | 3/2002 | Viets et al. | |
| 6,393,420 B1 | 5/2002 | Peters | |
| 6,446,090 B1 | 9/2002 | Hart | |
| 6,519,700 B1 | 2/2003 | Ram et al. | |
| 6,529,956 B1 | 3/2003 | Smith et al. | |
| 6,557,039 B1 * | 4/2003 | Leong et al. | 709/229 |
| 6,584,466 B1 | 6/2003 | Serbinis et al. | |
| 6,587,946 B1 | 7/2003 | Jakobsson | |
| 6,603,857 B1 * | 8/2003 | Batten-Carew et al. | 380/44 |
| 6,611,599 B2 | 8/2003 | Natarajan | |
| 6,611,846 B1 | 8/2003 | Stoodley | |
| 6,678,835 B1 | 1/2004 | Shah et al. | |
| 6,687,822 B1 | 2/2004 | Jakobsson | |
| 6,711,683 B1 | 3/2004 | Laczko et al. | |
| 6,801,999 B1 | 10/2004 | Venkatesan et al. | |
| 6,807,534 B1 | 10/2004 | Erickson | |
| 6,810,389 B1 | 10/2004 | Meyer | |
| 6,826,698 B1 | 11/2004 | Minkin et al. | |
| 6,851,050 B2 | 2/2005 | Singhal et al. | |
| 6,865,555 B2 | 3/2005 | Novak | |
| 6,877,136 B2 | 4/2005 | Bess et al. | |
| 6,892,306 B1 | 5/2005 | En-Seung et al. | |
| 6,907,034 B1 | 6/2005 | Begis | |
| 6,915,425 B2 * | 7/2005 | Xu et al. | 713/165 |
| 6,915,435 B1 * | 7/2005 | Merriam | 726/5 |
| 6,931,597 B1 * | 8/2005 | Prakash | 715/741 |
| 6,944,183 B1 | 9/2005 | Iyer et al. | |
| 6,950,941 B1 | 9/2005 | Lee et al. | |
| 6,950,943 B1 | 9/2005 | Bacha et al. | |
| 6,968,060 B1 | 11/2005 | Pinkas | |
| 6,971,018 B1 | 11/2005 | Witt et al. | |
| 6,978,377 B1 | 12/2005 | Asano et al. | |
| 6,988,133 B1 | 1/2006 | Zavalkovsky et al. | |
| 6,988,199 B2 | 1/2006 | Toh et al. | |
| 7,003,661 B2 | 2/2006 | Beattie et al. | |
| 7,035,910 B1 | 4/2006 | Dutta et al. | |
| 7,046,807 B2 | 5/2006 | Hirano et al. | |
| 7,058,696 B1 | 6/2006 | Phillips et al. | |
| 7,096,266 B2 | 8/2006 | Lewin et al. | |
| 7,107,416 B2 * | 9/2006 | Stuart et al. | 711/159 |
| 7,117,322 B2 * | 10/2006 | Hochberg et al. | 711/160 |
| 7,134,041 B2 | 11/2006 | Murray et al. | |
| 7,146,388 B2 * | 12/2006 | Stakutis et al. | 707/204 |
| 7,146,498 B1 | 12/2006 | Takechi et al. | |
| 7,177,427 B1 | 2/2007 | Komuro et al. | |
| 7,181,017 B1 | 2/2007 | Nagel et al. | |
| 7,194,764 B2 | 3/2007 | Martherus et al. | |
| 7,203,317 B2 * | 4/2007 | Kallahalla et al. | 380/278 |
| 7,203,968 B2 | 4/2007 | Asano et al. | |
| 7,219,230 B2 | 5/2007 | Riedel et al. | |
| 7,225,256 B2 | 5/2007 | Villavicencio | |
| 7,227,953 B2 | 6/2007 | Shida | |
| 7,233,948 B1 | 6/2007 | Shamoon et al. | |
| 7,237,002 B1 | 6/2007 | Estrada et al. | |
| 7,290,148 B2 | 10/2007 | Tozawa et al. | |
| 7,308,702 B1 | 12/2007 | Thomsen et al. | |
| 7,313,824 B1 | 12/2007 | Bala et al. | |
| 7,319,752 B2 | 1/2008 | Asano et al. | |
| 7,340,600 B1 | 3/2008 | Corella | |
| 7,380,120 B1 * | 5/2008 | Garcia | 713/160 |
| 7,383,586 B2 | 6/2008 | Cross et al. | |
| 7,386,529 B2 | 6/2008 | Kiessig et al. | |
| 7,434,048 B1 * | 10/2008 | Shapiro et al. | 713/165 |
| 2001/0011254 A1 | 8/2001 | Clark | |
| 2002/0050098 A1 | 5/2002 | Chan | |
| 2002/0062240 A1 | 5/2002 | Morinville | |
| 2002/0077986 A1 | 6/2002 | Kobata et al. | |
| 2002/0099947 A1 | 7/2002 | Evans | |
| 2002/0143906 A1 | 10/2002 | Tormasov et al. | |
| 2002/0157016 A1 | 10/2002 | Russell et al. | |
| 2002/0172367 A1 | 11/2002 | Mulder et al. | |
| 2002/0176572 A1 | 11/2002 | Ananth | |
| 2002/0194484 A1 | 12/2002 | Bolosky et al. | |
| 2003/0028610 A1 | 2/2003 | Pearson | |
| 2003/0046238 A1 | 3/2003 | Nonaka et al. | |
| 2003/0056139 A1 | 3/2003 | Murray et al. | |
| 2003/0081784 A1 | 5/2003 | Kallahalla et al. | |
| 2003/0081787 A1 | 5/2003 | Kallahalla et al. | |
| 2003/0101072 A1 * | 5/2003 | Dick et al. | 705/1 |
| 2003/0110266 A1 | 6/2003 | Rollins et al. | |
| 2003/0115570 A1 | 6/2003 | Bisceglia | |
| 2003/0126434 A1 | 7/2003 | Lim et al. | |
| 2003/0159066 A1 | 8/2003 | Staw et al. | |
| 2003/0172280 A1 | 9/2003 | Scheidt et al. | |
| 2003/0177378 A1 * | 9/2003 | Wittkotter | 713/193 |
| 2003/0196096 A1 | 10/2003 | Sutton | |
| 2003/0197729 A1 | 10/2003 | Denoue et al. | |
| 2003/0217264 A1 | 11/2003 | Martin et al. | |
| 2003/0226013 A1 | 12/2003 | Dutertre | |
| 2003/0233650 A1 | 12/2003 | Zaner et al. | |
| 2004/0022390 A1 | 2/2004 | McDonald et al. | |
| 2004/0039781 A1 | 2/2004 | LaVallee et al. | |
| 2004/0068524 A1 | 4/2004 | Aboulhosn et al. | |
| 2004/0073660 A1 | 4/2004 | Toomey | |
| 2004/0088548 A1 | 5/2004 | Smetters et al. | |
| 2004/0133544 A1 | 7/2004 | Kiessig et al. | |
| 2004/0158586 A1 | 8/2004 | Tsai | |
| 2004/0193905 A1 | 9/2004 | Lirov et al. | |
| 2004/0199514 A1 | 10/2004 | Rosenblatt et al. | |
| 2005/0021629 A1 | 1/2005 | Cannata et al. | |
| 2005/0028006 A1 | 2/2005 | Leser et al. | |
| 2005/0071657 A1 * | 3/2005 | Ryan | 713/193 |
| 2005/0097061 A1 * | 5/2005 | Shapiro et al. | 705/67 |
| 2005/0168766 A1 * | 8/2005 | Troyansky et al. | 358/1.14 |
| 2005/0177858 A1 | 8/2005 | Ueda | |
| 2005/0223242 A1 * | 10/2005 | Nath | 713/193 |
| 2005/0235154 A1 | 10/2005 | Serret-Avila | |
| 2005/0256909 A1 | 11/2005 | Aboulhosn et al. | |
| 2005/0283610 A1 | 12/2005 | Serret-Avila et al. | |

| | | | |
|---|---|---|---|
| 2006/0101285 A1* | 5/2006 | Chen et al. | 713/193 |
| 2006/0168147 A1 | 7/2006 | Inoue et al. | |
| 2007/0067837 A1 | 3/2007 | Schuster | |

FOREIGN PATENT DOCUMENTS

| | | |
|---|---|---|
| EP | 1 107 504 B1 | 6/2001 |
| EP | 1324565 A1 | 7/2003 |
| WO | WO 96/41288 A1 | 12/1996 |
| WO | WO 01/77783 A2 | 10/2001 |

OTHER PUBLICATIONS

Boneh et al., "Hierarchical Identity Based Encryption with Constant Size Ciphertext," Advances in Cryptology- Eurocrypt 2005, vol. 3493, Jun. 20, 2005, pp. 440-456.

Boneh et al., "IBE Secure E-mail," Stanford University, Apr. 8, 2002, http://crypto.stanford.edu/ibe/.

* cited by examiner

| ID | KEY PAIR | START DATE | END DATE | EXPIRATION DATE |
|---|---|---|---|---|
| 1 | K1pub, K1pri | 3/1/2004 | 3/31/2004 | 8/31/2004 |
| 2 | K2pub, K2pri | 4/1/2004 | 4/30/2004 | 9/30/2004 |

| ID | KEY PAIR | START DATE | END DATE | EXPIRATION DATE |
|---|---|---|---|---|
| 1 | K1pub, K1pri | 3/1/2004 | 3/31/2004 | 8/31/2004 |
| 2 | K2pub, K2pri | 4/1/2004 | 4/30/2004 | 9/30/2004 |
| 3 | K3pub, K3pri | 5/1/2004 | 5/31/2004 | 10/31/2004 |

404

| ID | KEY PAIR | START DATE | END DATE | EXPIRATION DATE |
|---|---|---|---|---|
| 1 | K1pub, K1pri | 3/1/2004 | 3/31/2004 | 8/31/2004 |
| 2 | K2pub, K2pri | 4/1/2004 | 4/30/2004 | 9/30/2004 |
| 3 | K3pub, K3pri | 5/1/2004 | 5/31/2004 | 10/31/2004 |
| 4 | K4pub, K4pri | 6/1/2004 | 6/30/2004 | 11/30/2004 |

| ID | KEY PAIR | START DATE | END DATE | EXPIRATION DATE |
|---|---|---|---|---|
| 1 | K1pub, K1pri | 3/1/2004 | 3/31/2004 | 8/31/2004 |
| 2 | K2pub, K2pri | 4/1/2004 | 4/30/2004 | 9/30/2004 |
| 3 | K3pub, K3pri | 5/1/2004 | 5/31/2004 | 10/31/2004 |
| 4 | K4pub, K4pri | 6/1/2004 | 6/30/2004 | 11/30/2004 |
| 5 | K5pub, K5pri | 7/1/2004 | 7/31/2004 | 12/31/2004 |

| ID | KEY PAIR | START DATE | END DATE | EXPIRATION DATE |
|---|---|---|---|---|
| 1 | K1pub, K1pri | 3/1/2004 | 3/31/2004 | 8/31/2004 |
| 2 | K2pub, K2pri | 4/1/2004 | 4/30/2004 | 9/30/2004 |
| 3 | K3pub, K3pri | 5/1/2004 | 5/31/2004 | 10/31/2004 |
| 4 | K4pub, K4pri | 6/1/2004 | 6/30/2004 | 11/30/2004 |
| 5 | K5pub, K5pri | 7/1/2004 | 7/31/2004 | 12/31/2004 |
| 6 | K6pub, K6pri | 8/1/2004 | 8/31/2004 | 1/31/2005 |

| ID | KEY PAIR | START DATE | END DATE | EXPIRATION DATE |
|---|---|---|---|---|
| 2 | K2pub, K2pri | 4/1/2004 | 4/30/2004 | 9/30/2004 |
| 3 | K3pub, K3pri | 5/1/2004 | 5/31/2004 | 10/31/2004 |
| 4 | K4pub, K4pri | 6/1/2004 | 6/30/2004 | 11/30/2004 |
| 5 | K5pub, K5pri | 7/1/2004 | 7/31/2004 | 12/31/2004 |
| 6 | K6pub, K6pri | 8/1/2004 | 8/31/2004 | 1/31/2005 |
| 7 | K7pub, K7pri | 9/1/2004 | 9/30/2004 | 2/28/2005 |

*FIG. 4F*

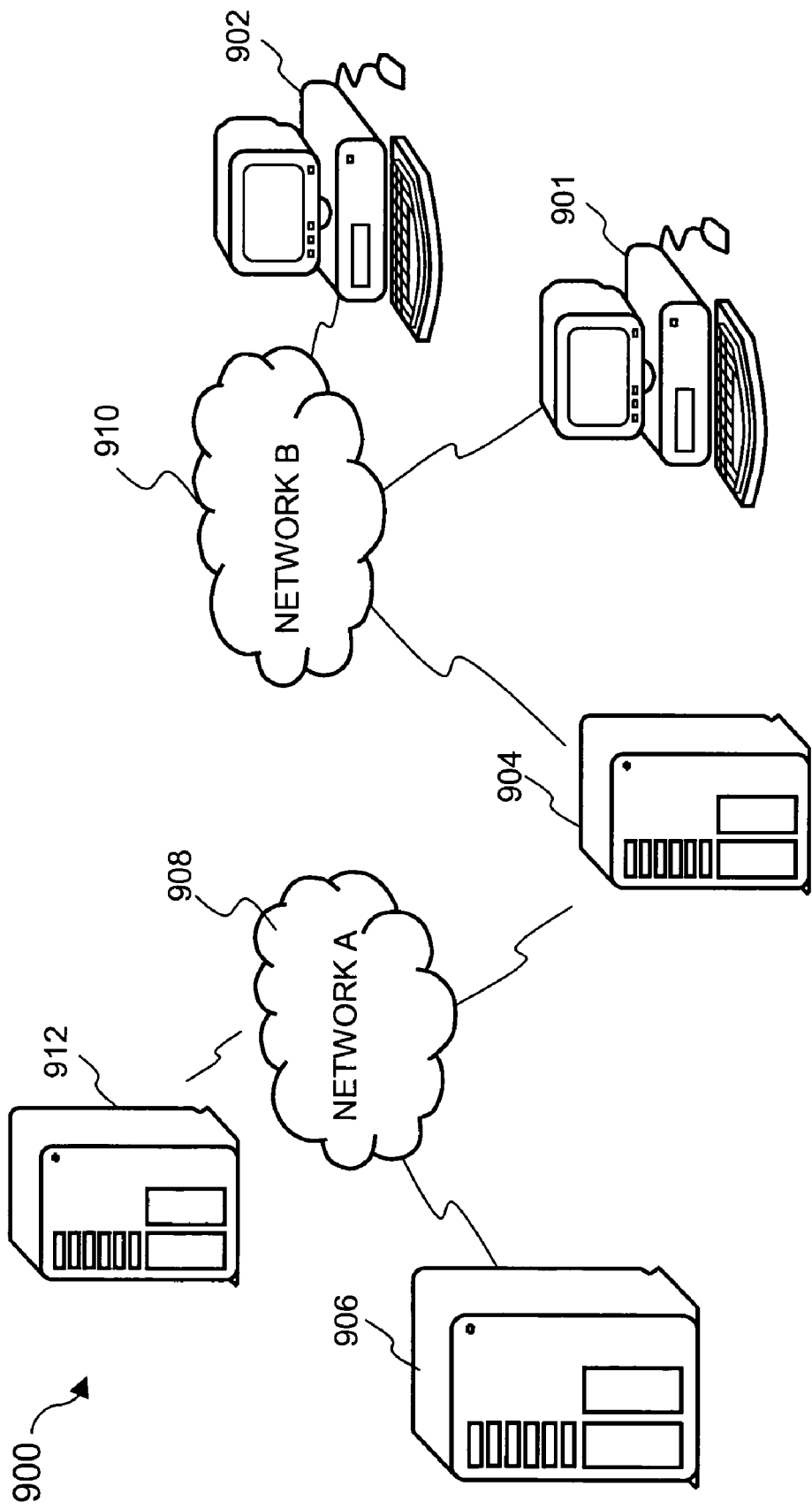

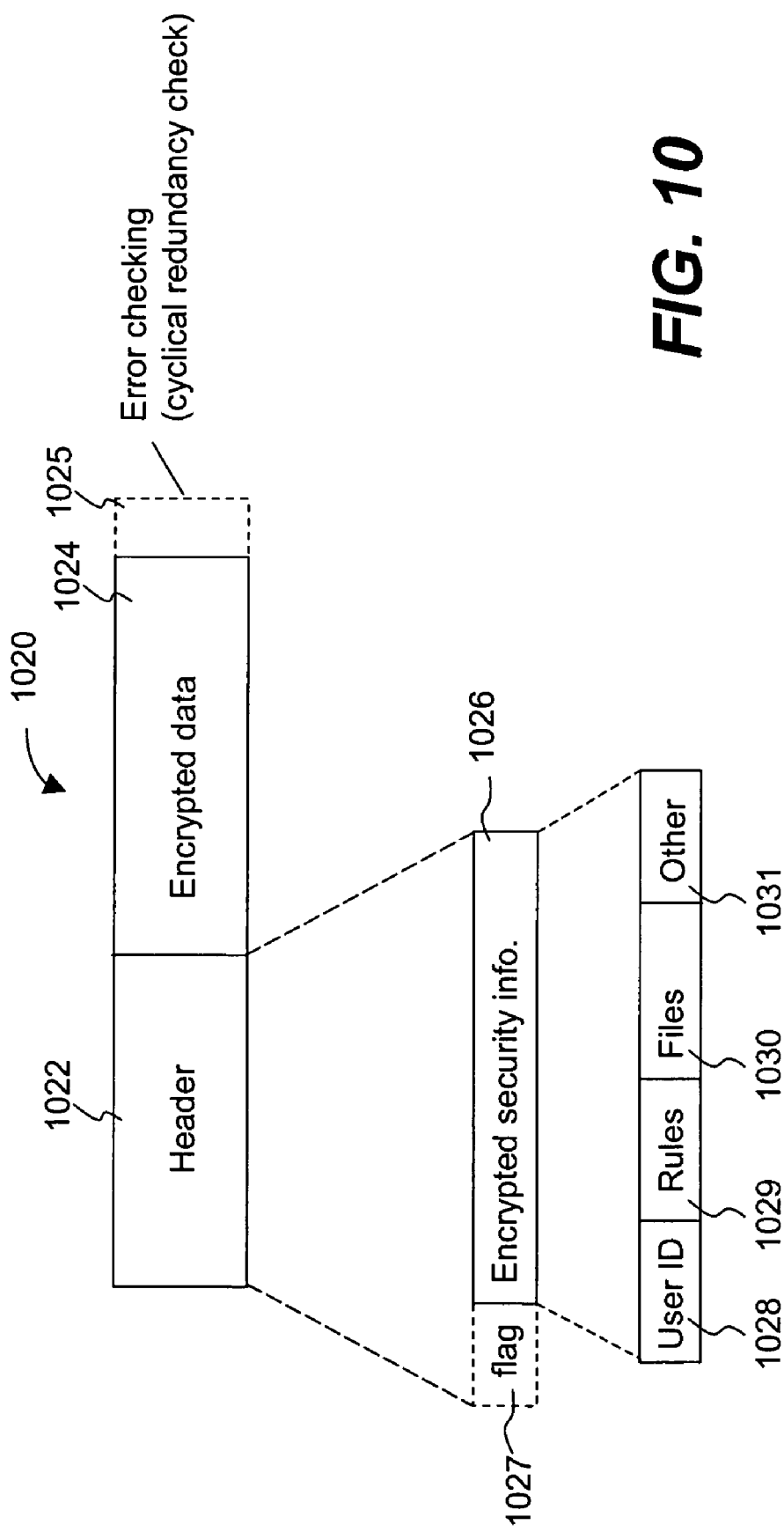

METHOD AND SYSTEM FOR PROVIDING CRYPTOGRAPHIC DOCUMENT RETENTION WITH OFF-LINE ACCESS

CROSS-REFERENCE TO RELATED APPLICATIONS

This application is related to: (i) U.S. patent application Ser. No. 10/815,251, filed concurrently herewith, and entitled "METHOD AND SYSTEM FOR PROVIDING DOCUMENT RETENTION USING CRYPTOGRAPHY," which is hereby incorporated herein by reference; (ii) U.S. patent application Ser. No. 10/206,737, filed Jul. 26, 2002, and entitled "METHOD AND SYSTEM FOR UPDATING KEYS IN A DISTRIBUTED SECURITY SYSTEM," which is hereby incorporated herein by reference; (iii) U.S. patent application Ser. No. 10/676,850, filed Sep. 30, 2003, and entitled "METHOD AND SYSTEM FOR SECURING DIGITAL ASSETS USING TIME-BASED SECURITY CRITERIA," which is hereby incorporated herein by reference; (iv) U.S. patent application Ser. No. 10/405,587, filed Apr. 1, 2003, and entitled "METHOD AND SYSTEM FOR SECURING DIGITAL ASSETS USING CONTENT TYPE DESIGNATIONS," which is hereby incorporated herein by reference; (v) U.S. patent application Ser. No. 10/246,079, filed Sep. 17, 2002, and entitled "METHOD AND APPARATUS FOR GENERATING KEYS FROM ACCESS RULES IN A DECENTRALIZED MANNER AND METHODS THEREFOR," which is hereby incorporated herein by reference; (vi) U.S. patent application Ser. No. 10/186,203, filed Jun. 26, 2002, and entitled "METHOD AND SYSTEM FOR IMPLEMENTING CHANGES TO SECURITY POLICIES IN A DISTRIBUTED SECURITY SYSTEM," which is hereby incorporated herein by reference; (vii) U.S. patent application Ser. No. 10/159,537, filed May 5, 2002, and entitled "METHOD AND APPARATUS FOR SECURING DIGITAL ASSETS," which is hereby incorporated herein by reference; and (viii) U.S. patent application Ser. No. 10/127,109, filed Apr. 22, 2002, and entitled "EVALUATION OF ACCESS RIGHTS TO SECURED DIGITAL ASSETS," which is hereby incorporated herein by reference.

BACKGROUND OF THE INVENTION

1. Field of the Invention

The present invention relates to security systems for data and, more particularly, to security systems that protect electronic files in an inter/intra enterprise environment.

2. Description of Related Art

The Internet is the fastest growing telecommunications medium in history. This growth and the easy access it affords have significantly enhanced the opportunity to use advanced information technology for both the public and private sectors. It provides unprecedented opportunities for interaction and data sharing among businesses and individuals. However, the advantages provided by the Internet come with a significantly greater element of risk to the confidentiality and integrity of information. The Internet is an open, public and international network of interconnected computers and electronic devices. Without proper security means, an unauthorized person or machine may intercept information traveling across the Internet and even gain access to proprietary information stored in computers that interconnect to the Internet.

There are many efforts in progress aimed at protecting proprietary information traveling across the Internet and controlling access to computers carrying the proprietary information. Cryptography allows people to carry over the confidence found in the physical world to the electronic world, thus allowing people to do business electronically without worries of deceit and deception. Every day millions of people interact electronically, whether it is through e-mail, e-commerce (business conducted over the Internet), ATM machines, or cellular phones. The perpetual increase of information transmitted electronically has led to an increased reliance on cryptography.

One of the ongoing efforts in protecting the proprietary information traveling across the Internet is to use one or more cryptographic techniques to secure a private communication session between two communicating computers on the Internet. The cryptographic techniques provide a way to transmit information across an unsecure communication channel without disclosing the contents of the information to anyone eavesdropping on the communication channel. Using an encryption process in a cryptographic technique, one party can protect the contents of the data in transit from access by an unauthorized third party, yet the intended party can read the encrypted data after using a corresponding decryption process.

A firewall is another security measure that protects the resources of a private network from users of other networks. However, it has been reported that many unauthorized accesses to proprietary information occur from the inside, as opposed to from the outside. An example of someone gaining unauthorized access from the inside is when restricted or proprietary information is accessed by someone within an organization who is not supposed to do so. Due to the open nature of networks, contractual information, customer data, executive communications, product specifications, and a host of other confidential and proprietary intellectual property remain available and vulnerable to improper access and usage by unauthorized users within or outside a supposedly protected perimeter.

Many businesses and organizations have been looking for effective ways to protect their proprietary information. Typically, businesses and organizations have deployed firewalls, Virtual Private Networks (VPNs) and Intrusion Detection Systems (IDS) to provide protection. Unfortunately, these various security means have been proven insufficient to reliably protect proprietary information residing on private networks. For example, depending on passwords to access sensitive documents from within often causes security breaches when the password of a few characters long is leaked or detected. Consequently, various cryptographic means are deployed to provide restricted access to electronic data (namely, electronic documents) in security systems.

Besides restricting access to electronic documents, businesses and organizations also face the difficulty of implementing document retention for electronic documents. In today's heavily regulated business environment, various electronic documents need to be retained for a certain period of time and thereafter may be disposed of. Although conventional approaches are able to retain documents for a period of time and then dispose of them, these conventional approaches require that the retention duration be known and specified.

Moreover, today's businesses and organizations often utilize distributed computer systems coupled together by a network. Hence, electronic documents can likewise be distributed throughout the network of computer systems. More businesses and organizations are also permitting mobile or remote users to connect to the network of computer systems, download documents and thereafter use them locally when not connected to the central network.

As a result, conventional approaches are unable to impose document retention for the many electronic documents residing throughout the network as well as potentially residing on computers that are often off-line with respect to the network.

Therefore, there is a need to provide more effective ways to impose document retention restrictions on electronic resources in distributed computing environments.

SUMMARY OF THE INVENTION

The invention relates to techniques for utilizing security criteria to implement document retention for electronic documents. The security criteria can also limit when, how and where access to the electronic documents is permitted. The security criteria can pertain to keys (or ciphers) used to secure (e.g., encrypt) electronic files (namely, electronic documents), or to unsecure (e.g., decrypt) electronic files already secured. At least a portion of the security criteria can be used to implement document retention, namely, a document retention policy. After a secured electronic document has been retained for the duration of the document retention policy, the associated security criteria becomes no longer available, thus preventing subsequent access to the secured electronic document. In other words, access restrictions on electronic documents can be used to prevent access to electronic documents which are no longer to be retained.

In one embodiment, the security criteria can be managed by a document retention system. In another embodiment, the security criteria can be managed more generally by a file security system.

The invention can be implemented in numerous ways, including as a method, system, device, and computer readable medium. Several embodiments of the invention are discussed below.

As a method of providing automated document retention for electronic documents, one embodiment of the invention includes at least the acts of: obtaining an electronic document; assigning a document retention policy to the electronic document, the document retention policy being based on a recurring cut-off retention schedule; and cryptographically imposing the document retention policy on the electronic document.

As a method for periodically providing document retention keys to clients of a document retention system via a network, one embodiment of the invention includes at least the acts of: determining whether a cut-off period for a current or prior document retention key has been reached; generating a next document retention key to be used to encrypt electronic documents during a next cut-off period, the next document retention key having a document retention period associated therewith; and notifying any of the clients that are connected to the network of the next document retention key.

As a method for restricting access to an electronic document, one embodiment of the invention includes at least the acts of: identifying an electronic document to be secured, the electronic document having at least a data portion that contains data; obtaining a document key; encrypting the data portion of the electronic document using the document key to produce an encrypted data portion; obtaining a retention access key, the retention access key being used to enforce a document retention policy on the electronic document; encrypting the document key using the retention access key to produce an encrypted document key, the retention access key only being usable for the encrypting during a cut-off period; forming a secured electronic document from at least the encrypted data portion and the encrypted document key; and storing the secured electronic document.

As a method for accessing a secured electronic document by a requester, the secured electronic document having at least a header portion and a data portion, one embodiment of the invention includes at least the acts of: obtaining a retention access key, the retention access key being used to enforce a document retention period of a document retention policy on the electronic document, the retention access key being usable only during the document retention period following a cut-off period; obtaining an encrypted document key from the header portion of the secured electronic document; decrypting the encrypted document key using the retention access key to produce a document key; decrypting an encrypted data portion of the secured electronic document using the document key to produce a data portion; and supplying the data portion to the requestor.

As a computer readable medium including at least computer program code for providing automated document retention for electronic documents, one embodiment of the invention includes at least: computer program code for obtaining an electronic document; computer program code for assigning a document retention policy to the electronic document, the document retention policy being based on a recurring cut-off retention schedule; and computer program code for cryptographically imposing the document retention policy on the electronic document.

As a file security system for restricting access to electronic files, one embodiment of the invention includes at least a key store and an access manager. The key store stores a plurality of cryptographic key pairs. Each of the cryptographic key pairs includes a public key and a private key. At least one of the cryptographic key pairs pertains to a retention policy having a document retention period and a cut-off period. The access manager makes available, for each of the cut-off periods, a different one of the public keys of the at least one of the cryptographic key pairs. The access manager also determines whether the private key of the at least one of the cryptographic key pairs pertaining to the retention policy is permitted to be provided to a requestor based on whether the document retention period following the cut-off period has expired. A requestor requires the private key of the at least one of the cryptographic key pairs pertaining to the retention policy to access a secured electronic file. The secured electronic file was previously secured using the public key of the at least one of the cryptographic key pairs pertaining to the retention policy, and at the time the electronic file was so secured, the public key was within the cut-off period and available for use.

Other objects, features, and advantages of the present invention will become apparent upon examining the following detailed description of an embodiment thereof, taken in conjunction with the attached drawings.

BRIEF DESCRIPTION OF THE DRAWINGS

The present invention will be readily understood by the following detailed description in conjunction with the accompanying drawings, wherein like reference numerals designate like structural elements, and in which:

FIGS. 4A-4F illustrate various iterations of a document retention key table.

FIG. 9 shows a basic security system in which the invention may be practiced in accordance with one embodiment thereof.

FIG. 10 shows an exemplary data structure of a secured file that may be used in one embodiment of the invention.

DETAILED DESCRIPTION OF THE INVENTION

Figure 1:
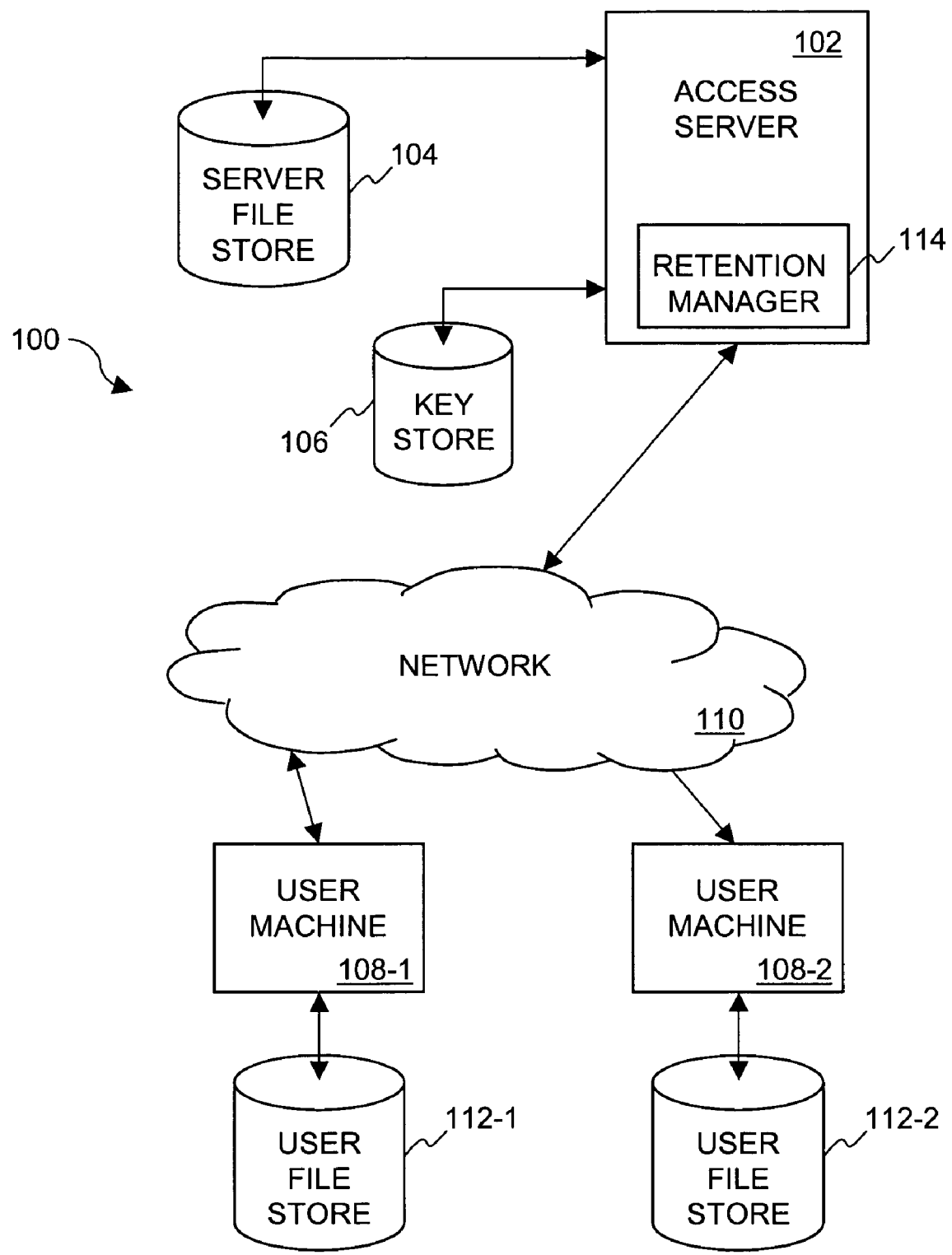
FIG. 1 is a block diagram of a file security system according to one embodiment of the invention.

The invention relates to techniques for utilizing security criteria to implement document retention for electronic documents. The security criteria can also limit when, how and where access to the electronic documents is permitted. The security criteria can pertain to keys (or ciphers) used to secure (e.g., encrypt) electronic files (namely, electronic documents), or to unsecure (e.g., decrypt) electronic files already secured. At least a portion of the security criteria can be used to implement document retention, namely, a document retention policy. After a secured electronic document has been retained for the duration of the document retention policy, the associated security criteria becomes no longer available, thus preventing subsequent access to the secured electronic document. In other words, access restrictions on electronic documents can be used to prevent access to electronic documents which are no longer to be retained.

In one embodiment, the security criteria can be managed by a document retention system. In another embodiment, the security criteria can be managed more generally by a file security system.

Secured files are files that require one or more keys, passwords, access privileges, etc. to gain access to their content. The security is often provided through encryption and access rules. The files, for example, can pertain to documents, multimedia files, data, executable code, images and text. In general, a secured file can only be accessed by authenticated users with appropriate access rights or privileges. In one embodiment, each secured file is provided with a header portion and a data portion, where the header portion contains, or points to, security information. The security information is used to determine whether access to associated data portions of secured files is permitted.

As used herein, a user may mean a human user, a software agent, a group of users, a member of the group, a device and/or application. Besides a human user who needs to access a secured document, a software application or agent sometimes needs to access secured files in order to proceed. Accordingly, unless specifically stated, the "user" as used herein does not necessarily pertain to a human being.

The invention is related to processes, systems, architectures and software products for providing automated retention of digital assets (e.g., electronic documents). The invention is particularly suitable in an enterprise environment. The invention can also be implemented by a security system that additionally secures digital assets (i.e., secured data) so that only authenticated users with appropriate access rights or privileges can gain access thereto. Digital assets may include, but not be limited to, various types of documents, multimedia files, data, executable code, images and text.

In the following description, numerous specific details are set forth in order to provide a thorough understanding of the invention. However, it will become obvious to those skilled in the art that the invention may be practiced without these specific details. The description and representation herein are the common meanings used by those experienced or skilled in the art to most effectively convey the substance of their work to others skilled in the art. In other instances, well-known methods, procedures, components, and circuitry have not been described in detail to avoid unnecessarily obscuring aspects of the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order, nor imply any limitations in the invention.

Embodiments of the invention are discussed herein with reference to FIGS. 1-10. However, those skilled in the art will readily appreciate that the detailed description given herein with respect to these figures is for explanatory purposes as the invention extends beyond these limited embodiments.

FIG. 1 is a block diagram of a file security system 100 according to one embodiment of the invention. The file security system 100 includes an access server 102 that provides central management for the file security system 100. The access server 102 can store or retrieve files from a server file store 104. The access server 102 can control the distribution of cryptographic keys from a key store 106. In addition, the access server 102 can generate cryptographic keys that are stored to the key store 106. Alternatively, the access server 102 can store cryptographic keys in the key store 106 that have been received by the access server 102.

The file security system 100 also includes user machines 108 and user file stores 112. The user machines 108 couple to the access server 102 via a network 110. The network 110 can be a private network or a public network. The user machine 108 also has a user file store 112 coupled thereto. The user file store 112 can store electronic files locally for the user of the corresponding user machine 108. On the other hand, the server file store 104 can provide centralized, remote storage of electronic files for any of the users of the user machines 108.

According to the invention, the file security system 100 enables a user at the user machine 108 to secure an electronic file (document) such that access to the secured electronic file is restricted. In one embodiment of the invention, the access restriction is or includes a document retention restriction. As an example, the document retention restriction could permit subsequent access to the secured electronic file only during the retention period. After the retention period, the secured electronic file would be unable to be unsecured and thus subsequent access would be cryptographically prevented.

In one embodiment, the retention period is specified or associated with a document retention policy that is assigned to the secured electronic file. To impose the retention period on the secured electronic document, a retention manager 114 within or coupled to the access manager 102 periodically distributes limited lifetime cryptographic keys to the user machines 108. However, in order to receive the limited lifetime cryptographic keys, the user machines 108 need to occasionally connect to the network 110 (i.e., on-line). In other words, the user machines 108 can operate to provide document retention even though they are often disconnected from the network 110 (i.e., off-line).

Once an electronic file has been secured, a user at a user machine can attempt to access the secured electronic file. In doing so, the user machine for the user would need to access the access server 102 and retrieve the appropriate one or more cryptographic keys from the key store 106 that are needed to unsecure the secured electronic file. Such requires that the user machine be connected to the network 110 (i.e., on-line). Alternatively, the user machine could have previously acquired the appropriate one or more cryptographic keys needed to unsecure the secured electronic file and, in such case, the user machine can unsecure the secured electronic file without connecting to the network (i.e., off-line). Regardless, after expiration of the retention period for the secured electronic document, the appropriate one or more cryptographic keys needed to unsecure the secured electronic file are expired (e.g., at both the access server 102/key store 106 and the user machines). Consequently, following the expiration of the retention period the appropriate one or more cryptographic keys are no longer usable, thus access to the secured electronic document is prevented. The access server 102 and/or the user machine normally also require the user to be authorized to access the electronic file prior to delivery or usage of at least certain cryptographic keys from the key store 106. Typically, the cryptographic keys needed to unsecure a secured electronic file are private keys.

Nevertheless, once the restrictions and/or authorizations have been satisfied and the private keys have been supplied, the private keys are usable to unsecure the secured electronic files, so long as the private keys have not expired. Typically, the private keys will expire after a relatively short period of time (e.g., 1-30 days) so that users are forced to again connect to the network 110 (i.e., be on-line) retrieve the necessary cryptographic keys.

In one embodiment, the retention policies being used are based on a recurring cutoff retention schedule. The recurring cutoff retention schedule periodically distributes keys from the access server 102 to user machines (if on-line). The keys are designed to be useable to imposed a retention policy only for a limited time (e.g., a cutoff period), and to expire after a retention period such that those electronic files having the retention policy imposed become no longer accessible.

Figure 2:
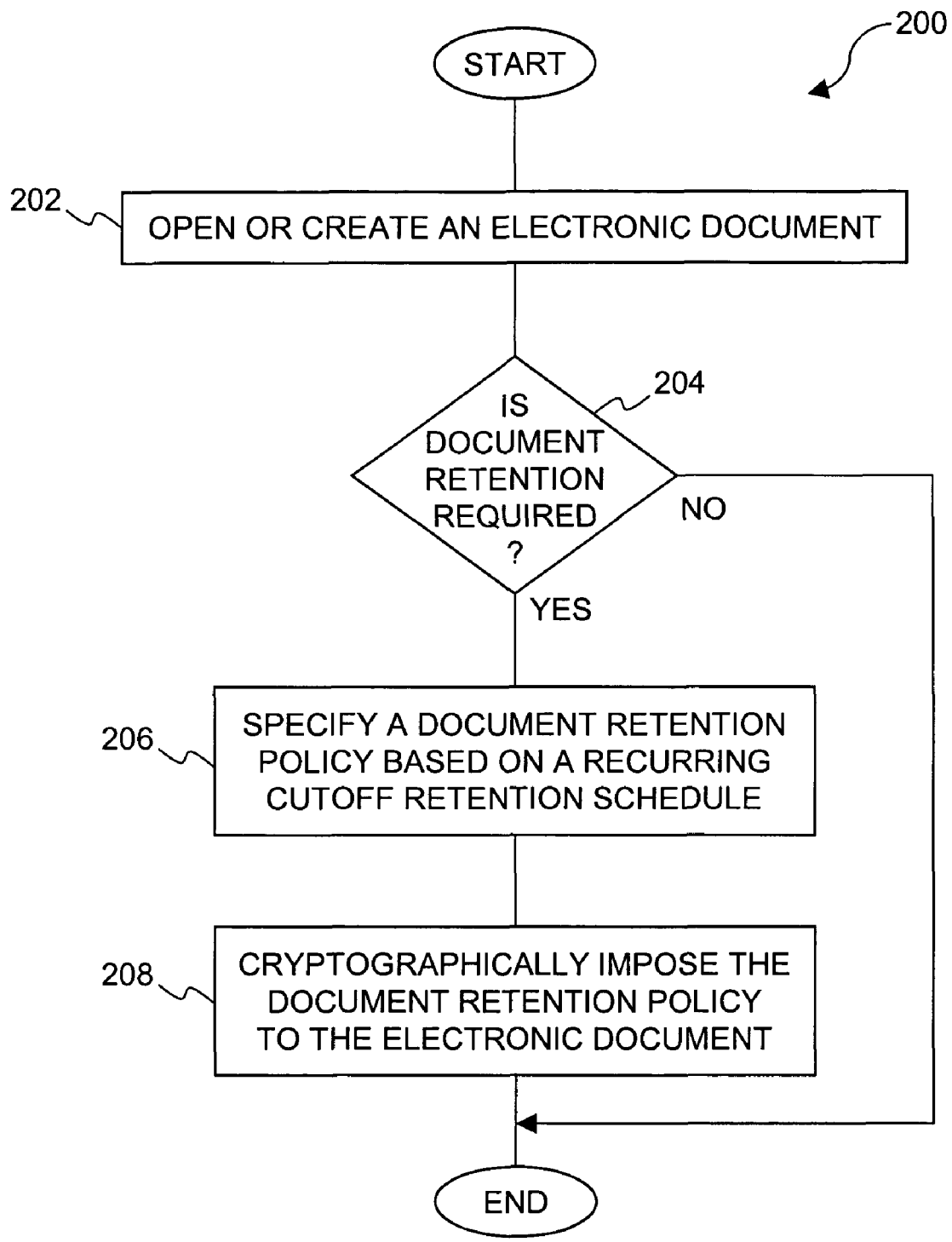
FIG. 2 is a flow diagram of a cryptographic document retention process according to one embodiment of the invention.

FIG. 2 is a flow diagram of a cryptographic document retention process 200 according to one embodiment of the invention. The cryptographic document retention process 200 can be performed at a computing device where electronic documents are accessed. For example, the cryptographic document retention process 200 can be performed on the user machines 108 illustrated in FIG. 1, regardless of whether the user machines are currently on-line or off-line with respect to the network 110.

The cryptographic document retention process 200 initially opens or creates 202 an electronic document. Typically, the user is an employee of a business entity, and the business entity has established a document retention policy that is to be enforced on the electronic document.

Once the electronic document is opened or created 202, a decision 204 determines whether document retention is requested. Here, the electronic document that is opened or created 202 can be associated with one or more of various different document types, categories or classifications. The document retention policy chosen or imposed on the electronic document may require document retention as to this particular electronic document. Hence, the decision 204 determines whether document retention is required for the particular electronic document.

When the decision 204 determines that document retention is required, a document retention policy is specified 206. The document retention policy can vary with the different document type, category or classification. The document retention policy that is specified 206 is such that it is based on a recurring cut-off retention schedule. The recurring cut-off retention schedule utilizes the notion of periodic cut-off and staggered retention periods for similarly categorized documents. Such a document retention policy is particularly advantageous for reducing key management burdens and for facilitating off-line users. Next, the document retention policy is cryptographically imposed 208 to the electronic document. Here, in one embodiment, a document retention key associated with the document retention policy to be imposed is typically acquired and utilized to encrypt (directly or indirectly) the electronic document. As such, the document retention policy is cryptographically imposed 208 on the electronic document.

On the other hand, when the decision 204 determines that document retention is not required, the cryptographic document retention process 200 bypasses the blocks 206 and 208 such that no document retention policy is imposed on the electronic document. Following the block 208, or its being bypassed, the cryptographic document retention process 200 is complete and ends.

Figure 3:
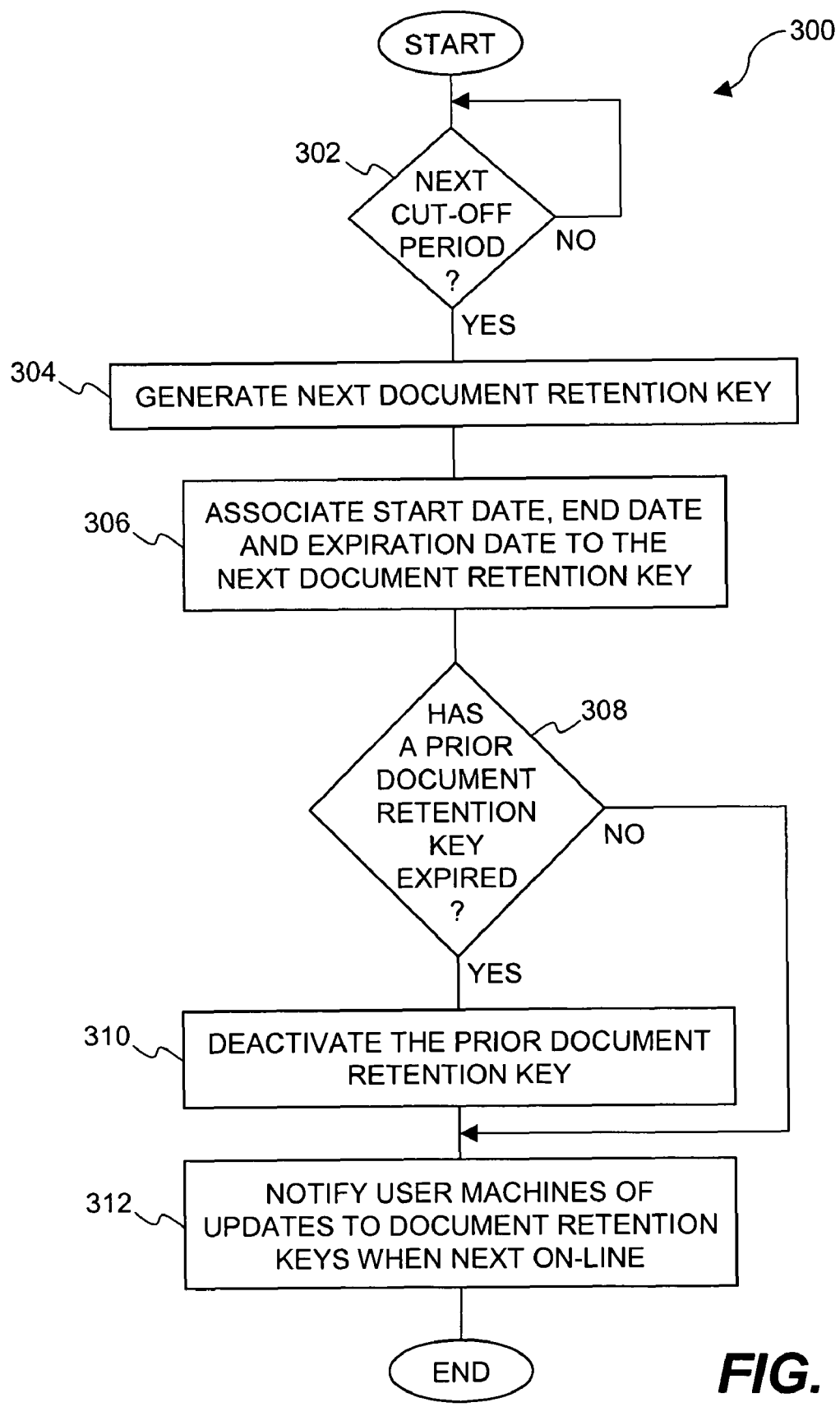
FIG. 3 is a flow diagram of a document retention key management process according to one embodiment of the invention.

FIG. 3 is a flow diagram of a document retention key management process 300 according to one embodiment of the invention. The document retention key management process 300 is typically performed at a central server location, such as by the retention manager 114 of the access server 102 illustrated in FIG. 1. The document retention key management process 300 implements a recurring cut-off retention schedule.

The document retention key management process 300 begins with a decision 302 that determines whether a next cut-off period has been reached. When the decision 302 determines that the next cut-off period has not yet been reached, the document retention key management process 300 awaits the next cut-off period.

On the other hand, when the decision 302 determines that the next cut-off period has been reached, a next document retention key is generated 304. In one embodiment, the next document retention key is a private key of a cryptographic key pair. The cryptographic key pair typically includes a public key for encrypting electronic documents, and a private key for decrypting electronic documents. Next, a start date, end date and expiration date are associated 306 to the next document retention key. In order to impose periodic cut-off and staggered retention periods, the document retention keys that are generated 304 are only used during a certain period (i.e., cut-off period), namely, from the start date to the end date, and expire after their expiration date. Hence, the next document retention key that is generated 304 is associated with the cut-off period now being processed. Typically, start date, the end date and the expiration date are specified by a document retention policy. In one implementation, the period of time between the start date and the end date (i.e., cut-off period) can be in accordance with a duration limit on off-line access.

A decision 308 then determines whether a prior document retention key has expired. Here, previously generated document retention keys expire in accordance with their expiration date. Hence, the decision 308 determines whether any of the previously generated document retention keys have expired. When the decision 308 determines that a prior document retention key has expired, the prior document retention key is deactivated 310. Once the prior document retention key is deactivated 310, it is deleted, disabled or otherwise altered so that the prior document retention key being deactivated 310 is no longer useable. Consequently, any electronic documents previously encrypted that require the document retention key for decryption are no longer accessible, that is, there are not longer retained. Alternatively, when the decision 308 determines that the prior document retention key has not expired, then the block 310 is bypassed.

Following the block 310, or its being bypassed, user machines are notified 312 of updates to document retention keys when next on-line. Here, the document retention key management 300 is typically performed by a server, and then the updates to the document retention keys (whether new keys or deactivated keys) are notified 312 to user machines (clients). However, since the user machines can be on-line or off-line, the notification to the user machines can be deferred until the user machines are next on-line. Once the user machines receive the notification 312, the user machines are able to use the next document retention key and also impose document retention by preventing further access to those documents previously being secured (i.e., encrypted) and which, for access thereto, require prior document retention keys that have since expired. Following the block 312, the document retention key management process 300 is complete and ends.

Although the document retention key management process 300 pertains to server-side operations, it should be understood that user machines (e.g., clients) can also evaluate and perform the operations such as determining whether a prior document retention key has expired and then deactivating the prior document retention key, if expired. As a result, even when user machines remain off-line for extended periods, the document retention policy is still imposed on electronic documents previously accessible by the user machines. As such, if the prior document retention key that imposes document retention on an electronic document has since been deactivated, the user machine would thereafter be unable to access the electronic document.

However, if the user machine has not been on-line for some period of time, the user machine may not have the next document retention key necessary to impose document retention policies on electronic documents that the user of the user machine may open or create. In this case, the user of the user machine can be prevented from opening or creating electronic documents completely or only in certain document types, categories or classifications. In another embodiment, it is possible that the user machines might themselves generate temporary document retention keys so that they are able to open or create electronic documents while off-line without hindrance yet still impose document retention policies.

FIGS. 4A-4F illustrate various iterations of a document retention key table according to one embodiment of the invention. The document retention key tables shown in FIGS. 4A-4F illustrate one representative implementation of a document security policy in which a recurring cut-off retention schedule is utilized. In this representative implementation, the recurring cut-off is one month, and the retention schedule (or duration) is six months. Hence, this monthly cut-off signifies that the maximum off-line period for users of user machines can also be one month.

Figure 4A:
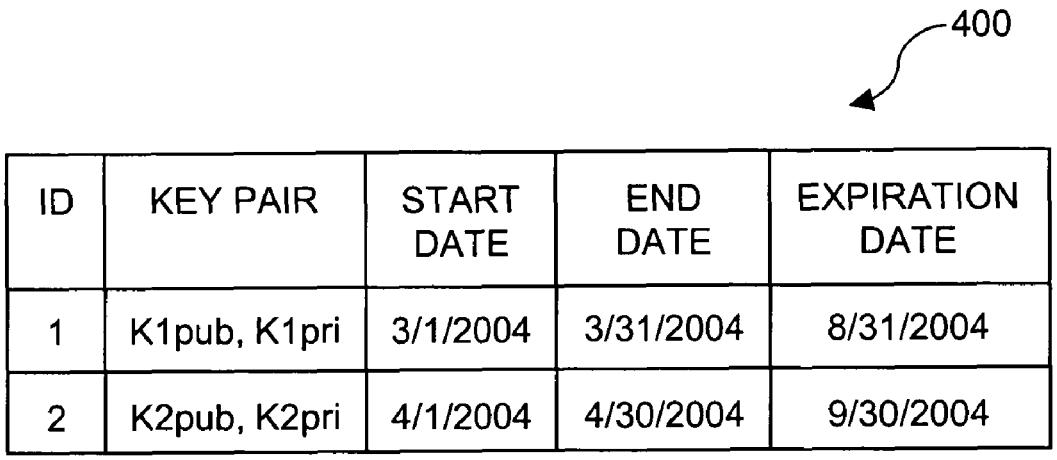

FIG. 4A illustrates an initial version 400 of a document retention key table. The first version 400 of the document retention key table contains two document retention keys. A first document retention key, identified by identifier (ID) 1, includes a first key pair (k-1) having a first public key (k-$1_{pb}$) and a first private key (k-$1_{pri}$). The first document retention key has a start date of Mar. 1, 2004, an end date of Mar. 31, 2004, and an expiration date of Aug. 31, 2004. Hence, the first key pair can be utilized to impose document retention only during the time period from the start date to the end date. Further, after the expiration date, document retention is imposed because the first key pair is no longer be obtainable after the expiration date. A second document retention key, identified by identifier (ID) 2, includes a second key pair (k-2) that is useable from Apr. 1, 2004 to Apr. 30, 2004, and expires Sep. 30, 2004.

Hence, each of the different key pairs appearing in the document retention key tables are useable to encrypt documents for a month because a monthly cut-off condition is utilized. Also, six months from the end date, the respective key pair expires, thereby establishing a six month retention schedule. The initial version 400 document retention key table shown in FIG. 1 initially provides first and second key pairs to a server or user machines. For example, if the document retention policy was first imposed on an electronic document on Mar. 15, 2004, the document retention key table 400 might be utilized, whereby the document retention key for the current month and the next month are provided.

Figure 4B:
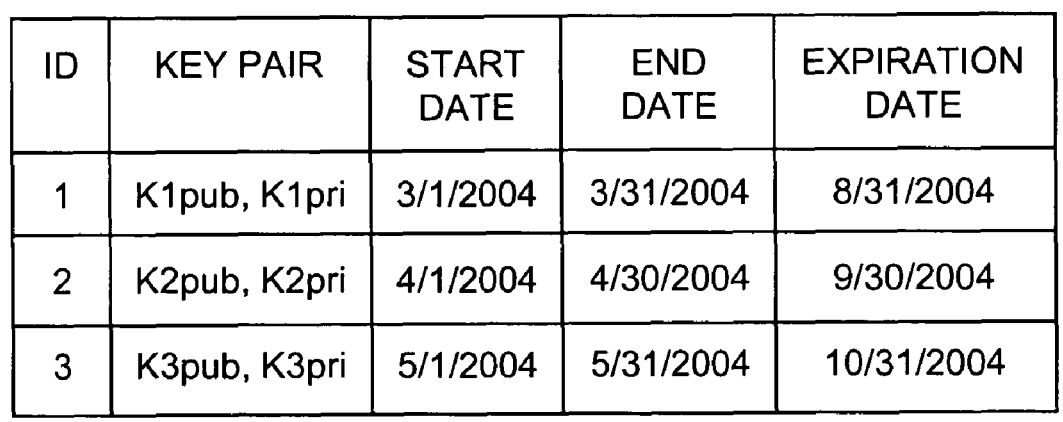

FIG. 4B illustrates a first updated version 402 of the document retention key table. The first updated version 402 additionally includes a third document retention key, identified by identifier (ID) 3. The third document retention key includes a third key pair (k-3) that is useable from May 1, 2004 through May 31, 2004, and expires Oct. 31, 2004. Hence, if the document retention key table is being utilized by a server or a user machine, such needs to receive the third key pair on or before May 1, 2004 in order to continue to be able to open or create certain electronic documents and impose a document retention policy. In one embodiment, in order for user machines to receive the first updated version 402 of the document retention key table, the user machine would need to gain on-line access to the server. As such, if the user has not gained on-line access with the server for more than the maximum off-line period (e.g., one month), the user may be unable to obtain the first version update 402 of the document retention key table. In such case, the user may not be able to open or create certain electronic documents that require the document retention policy and thus require the availability of the third key pair.

FIG. 4C contains a second version update 404 of the document retention key table. The second version update 404 of the document retention key table provides a fourth document retention key, identified by identifier (ID) 4. The fourth document retention key includes a fourth key pair (k-4) useable from Jun. 1, 2004 through Jun. 30, 2004, and expires Nov. 30, 2004.

FIG. 4D illustrates a third version update 406 of the document retention key table. The third version update 404 of the document retention key table provides a fifth document retention key, identified by identifier (ID) 5. The fifth document retention key includes in which a fifth key pair (k-5) is provided and useable from Jul. 1, 2004 through Jul. 31, 2004, and expires Dec. 31, 2004.

FIG. 4E illustrates a fourth version update 408 of the document retention key table. The fourth version update 408 of the document retention key table further provides a sixth document retention key, identified by identifier (ID) 6. The sixth document retention key includes a sixth key pair (k-6) useable from Aug. 1, 2004 through Aug. 31, 2004, and expires Jan. 31, 2004.

At this point, it should be noted that at the end of the August 2004, the first document retention key, namely, the first key pair (k-1) expires. The expiration of the first key pair (k-1) indicates that any documents previously created (during March 2004) using the first key pair (k-1) impose a document retention schedule such that those documents are no longer accessible after Aug. 31, 2004.

FIG. 4F illustrates a fifth version update 410 of the document retention key table. The fifth version update 410 of the document retention key table provides a seventh document retention key, identified by identifier (ID) 7. The seventh document retention key includes a seventh key pair (k-7) useable from Sep. 1, 2004 through Sep. 30, 2004, and expires Feb. 28, 2005. Although not necessary, assume that the fifth version update 410 is provided to the server or user machines on Sep. 1, 2004. In such case, it should be noted that the first key pair (k-1) is no longer present in the fifth version update 410 of the document retention key table. In particular, since the expiration date of the first key pair (k-1) was Aug. 31, 2004, the first key pair (k-1) has been deactivated and is effectively no longer in existence. As a result, document retention for those electronic documents that utilized the first key pair (k-1) in imposing document retention are now no longer accessible. Hence, even if a user machine contained a copy of the electronic document that utilized the first key pair (k-1) to impose document retention, such electronic document would not be accessible after Aug. 31, 2004 because the first key pair (k-1) is no longer in existence.

Consequently, document retention has been cryptographically imposed for on-line or off-line users with a controlled amount of overhead in order to manage the retention periods and cryptographic keys required.

Once keys or key pairs are expired, they can be deactivated in a variety of different ways. For example, the keys can be overwritten with dummy data in memory various times to insure their destruction. As another example, incoming new keys can overwrite expired keys.

Figure 5:
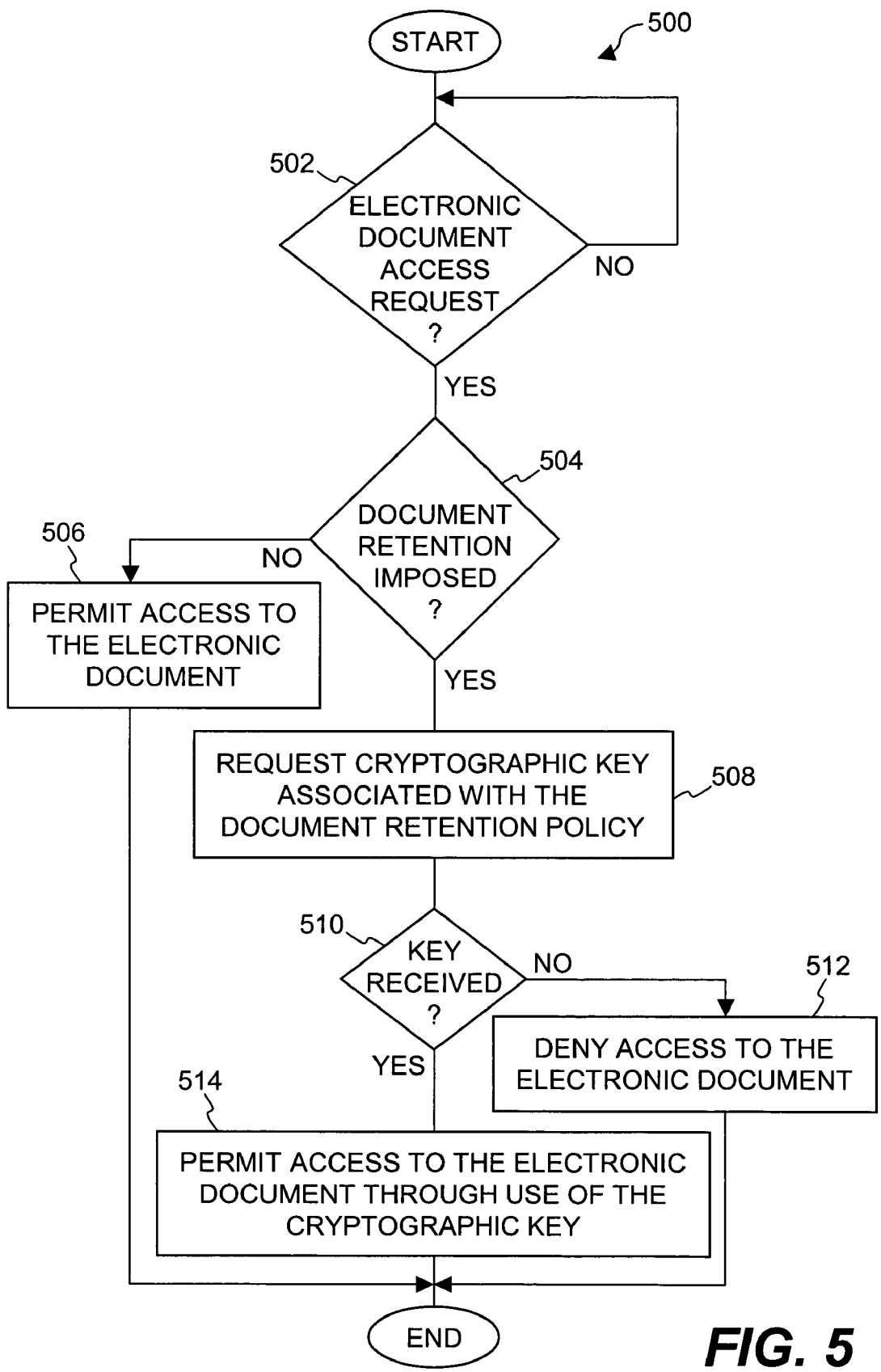
FIG. 5 is a flow diagram of an access request process according to one embodiment of the invention.

FIG. 5 is a flow diagram of an access request process 500 according to one embodiment of the invention. The access request process 500 is, for example, performed by a computing device, such as the user machines 108 illustrated in FIG. 1.

The access request process 500 begins with a decision 502 that determines whether an electronic document access request has been received. A user of a computing device can initiate an electronic document access request. When the decision 502 determines that an electronic document access request has not been received, then the access request process 500 awaits such as request. Once the decision 502 determines that a document access request has been received, then a decision 504 can determine whether document retention is imposed on the electronic document that is to be accessed. When the decision 504 determines that document retention is not imposed on the electronic document to be accessed, access to the electronic document is permitted 506.

On the other hand, when the decision 504 determines that document retention is imposed on the electronic document to be accessed, a cryptographic key associated with the document retention policy that is imposed on the electronic document is requested 508. A decision 510 then determines whether the requested key has been received. Here, the requested key is the cryptographic key that has been requested 508. In one implementation, such as shown in FIG. 1, the user machine 108 requests the key from the access server 102, and the cryptographic key is provided (if at all) to the user machine 108 via the network 110. In another implementation, the access server 102 can previously have provided the cryptographic key to the user machine 108 in advance of this request (block 508); hence, the requested key is readily available at the user machine so long as it has not expired. For example, the cryptographic key is, for example, the private key from the appropriate on the key pairs stored in the document retention key table shown in FIGS. 4A-4F.

When the decision 510 determines that the requested key has not been received, then access to the electronic document is denied 512. In this case, the document retention policy causes the cryptographic key to be no longer available to the requestor. In such case, although the requestor may have access to the electronic document, since the cryptographic key is not available, the requestor is not able to gain access to the electronic document. In other words, the electronic document remains in its encrypted format and thus unusable by the requestor. In such case, the document retention policy imposed on the electronic document caused the electronic document to expire.

On the other hand, when the decision 510 determines that the requested key has been received, then access to the electronic document is permitted 514 through use of the cryptographic key. In other words, the cryptographic key can be used to decrypt the encrypted electronic document, thereby allowing the requestor to gain access to the electronic document.

Following the operations 506, 512 and 514, the access request process 500 is complete and ends. However, it should be noted that additional layers of encryption could be imposed on the electronic document besides the level of encryption utilized to implement a document retention policy. Hence, other keys or requirements can be imposed by a file security system in order to further restrict access to the electronic documents. For example, co-pending U.S. patent application Ser. No. 10/405,587, filed Apr. 1, 2003 and entitled "METHOD AND SYSTEM FOR SECURING DIGITAL ASSETS USING CONTENT TYPE DESIGNATIONS," describes representative other document security measures and is hereby incorporated herein by reference.

As previously noted, document retention can be provided by a file security system. In which case, an electronic file can be cryptographically secured using a key that is associated with file retention. The key can then automatically be made unavailable after the retention period for the electronic document has been exceeded. Accordingly, the electronic file is no longer accessible after the retention period is exceeded. Typically, such inaccessibility is permanent and irreversible. However, in special situations, the automatic nature of the non-retention can be suspended so as to permit extended access. For example, a system administrator can cause the retention period to be extended so that the electronic file remains accessible even after the original extension period has been scheduled. This override capability can be important when, for example, legal issues arise concerning the electronic file. In such cases, the electronic file should be retained and not automatically expired. In one embodiment, the system administrator can either override an assigned retention period or set a new retention period.

Figure 6:
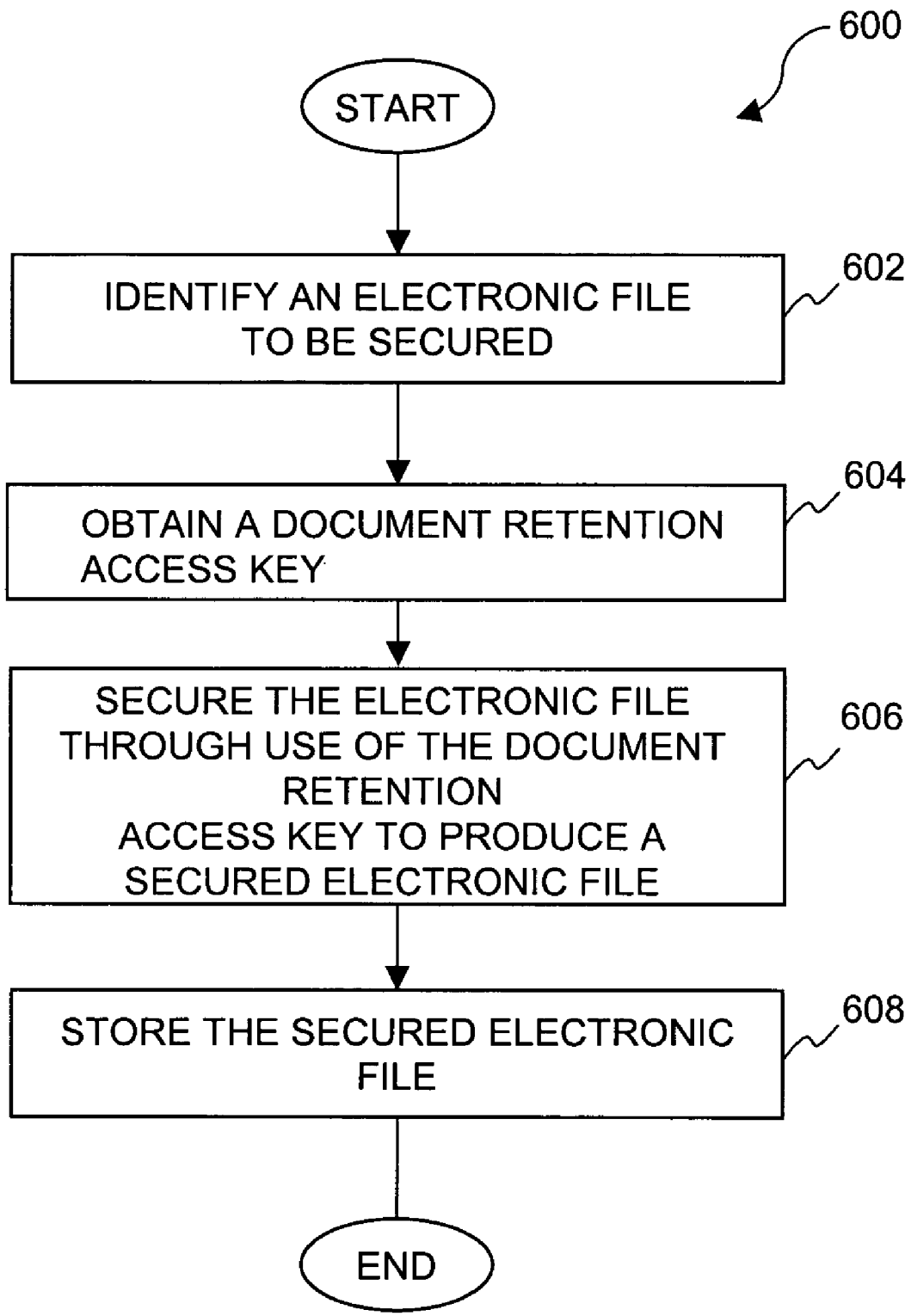
FIG. 6 is a flow diagram of a file securing process according to one embodiment of the invention.

FIG. 6 is a flow diagram of a file securing process 600 according to one embodiment of the invention. The file securing process 600 is, for example, performed by a computing device, such as the access server 102 or the user machines 108 illustrated in FIG. 1.

The file securing process 600 initially identifies 602 an electronic file to be secured. Here, the electronic file is identified to the computing device carrying out the file securing process 600. A user of the computing device may assist in the identification of the electronic file. After the electronic file to be secured has been identified 602, a document retention access key is obtained 604. Typically, the document retention access key is obtained 604 from an access server or a user machine. For example, if the file securing process 600 is performed by the user machine 108, the document retention access key can be retrieved remotely from the access server 102, which can retrieve the document retention access key from the key store 106, or locally from the user machine 108. The document retention access key is typically a public key and is normally readily available.

Next, after the document retention access key has been obtained 604, the electronic file is secured 606 through use of the document retention access key. The result of the securing of the electronic file is to produce a secured electronic file. Typically, the electronic file is cryptographically secured through encryption (directly or indirectly) using the document retention access key. In one embodiment, one or more other keys are used to further control access to the electronic file. Thereafter, the secured electronic file is stored 608. After the secured electronic file is stored 608, the file securing process 600 ends. Following the securing process 600, the secured electronic file can be distributed to the access server 102 and/or one or more user machines 108 having interested users.

Figure 7A:
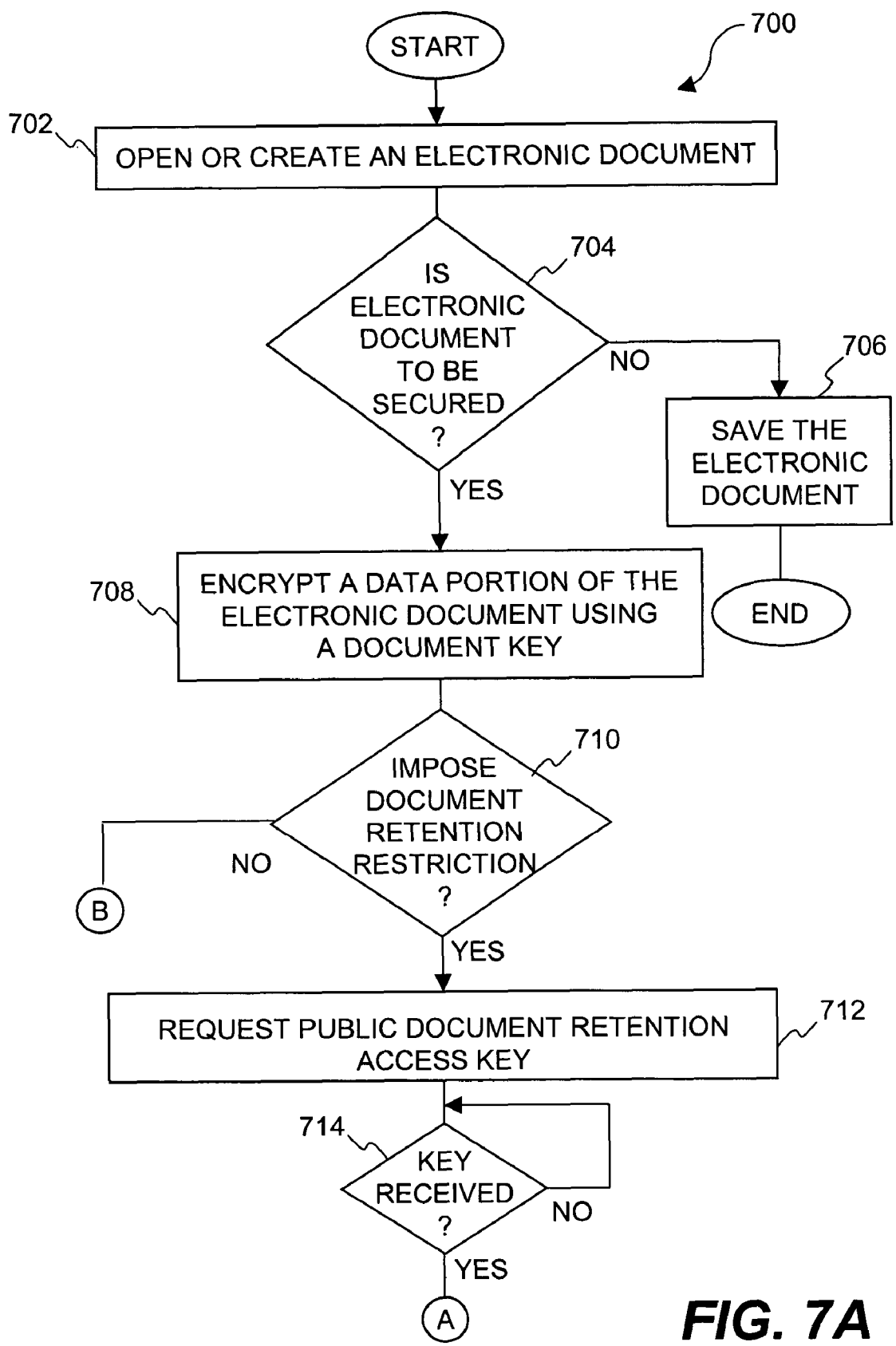
FIGS. 7A and 7B are flow diagrams of a document securing process according to one embodiment of the invention.
Figure 7B:
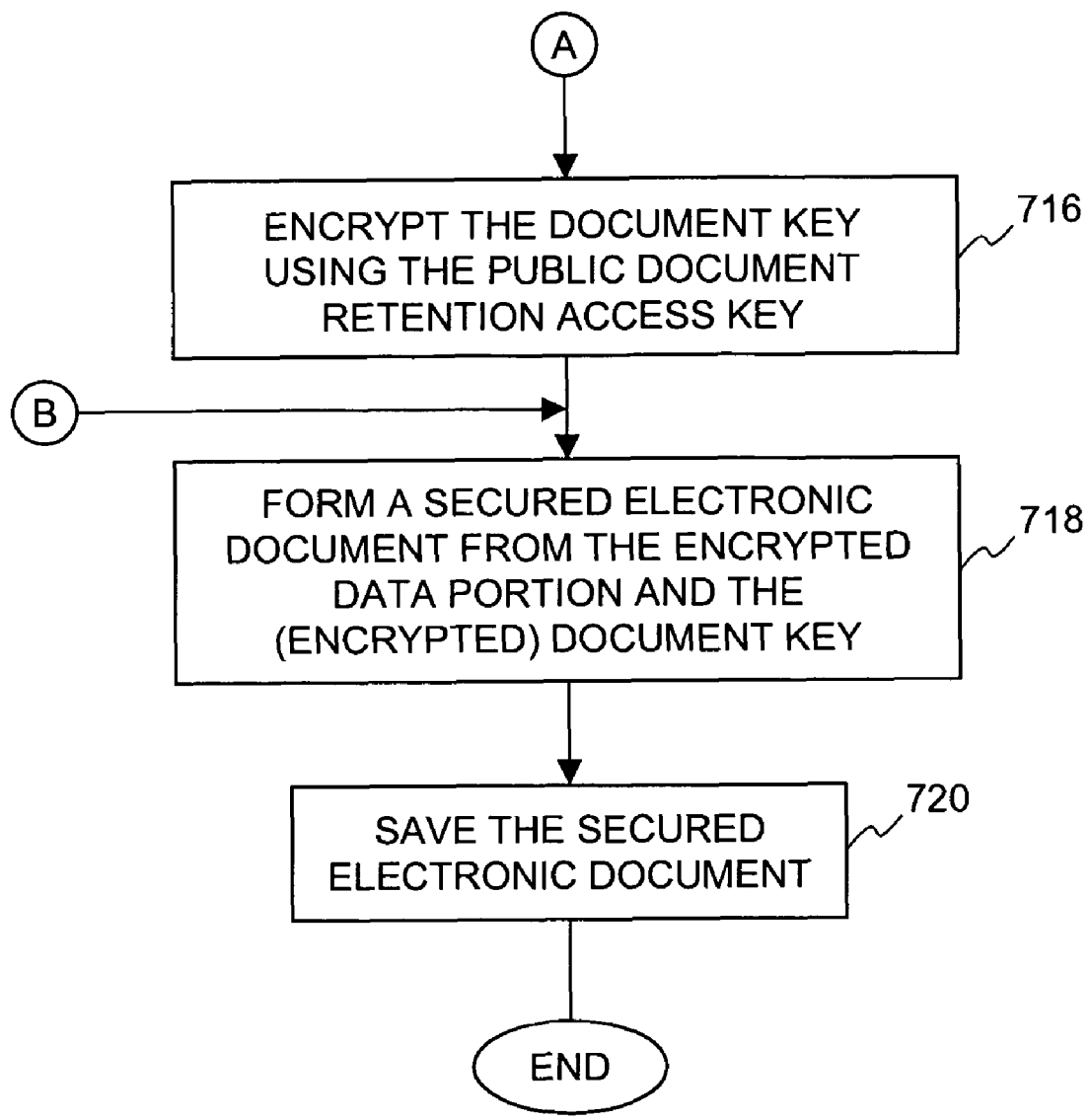

FIGS. 7A and 7B are flow diagrams of a document securing process 700 according to one embodiment of the invention. The document securing process 700 is, for example, performed by a computing device, such as the access server 102 or the user machines 108 illustrated in FIG. 1.

The document securing process 700 opens or creates 702 an electronic document. At this point, the electronic document is unsecure, which is often referred to as being in the "clear." Next, a decision 704 determines whether the electronic document is to be secured. Here, the user or creator of the electronic document has the option of securing the document, if so desired. When the decision 704 determines that the electronic document is not to be secured, then the electronic document is saved 706. Here, the electronic document being saved is not secured. Following the block 706, the document securing process 700 ends with the electronic document being saved in an unsecured fashion.

On the other hand, when the decision 704 determines that the electronic document is to be secured, then a data portion of the electronic document is encrypted 708 using a document key. The document key can be a cryptographic key that is generated or obtained. Typically, each document managed and secured by the file (document) security system would be encrypted 708 using a different document key. After the data portion of the electronic document has been encrypted 708, a decision 710 determines whether a document retention restriction should be imposed on the electronic document. The user or creator of the electronic document can have the option of securing the document with a document retention access restriction, if so desired.

When the decision 710 determines that a document retention restriction should be imposed on the electronic document, a public document retention access key is requested 712. In one embodiment, the public document retention access key can be requested from the access server 102 by the user machine 108. The access server 102 can then retrieve or generate the public document retention access key and supply it to the user machine 108. In an alternative implementation, the user machine may have already received the public document retention access key (e.g., such as in a key cache or table) and thus would not need to request such.

Next, a decision 714 determines whether the public document retention access key has been received. Once the decision 714 determines that the public document retention access key has been received (or already available), the document key is encrypted 716 using the public document retention access key. Here, the document key is being encrypted using the public document retention access key. In other words, the public document retention access key is indirectly used to encrypt the electronic document by encryption of the document key. Next, a secured electronic document is formed 718 from the encrypted data portion and the encrypted document key. Thereafter, the secured electronic document is saved 720. In this case, following the block 720, the document securing process 700 ends with the electronic document being saved in a secured fashion with at least a document retention access restriction.

Alternatively, when the decision 710 determines that a document retention access restriction is not to be imposed on the electronic document, then the blocks 712-716 are bypassed. In such case, the secured electronic document is formed 718 from the encrypted data portion and the document key. Here, the document key is not encrypted using a public document retention access key. The resulting secured electronic document is then saved 720. In this case, following the block 720, the document securing process 700 ends with the electronic document being saved in a secured fashion without any document retention access restrictions.

Figure 8:
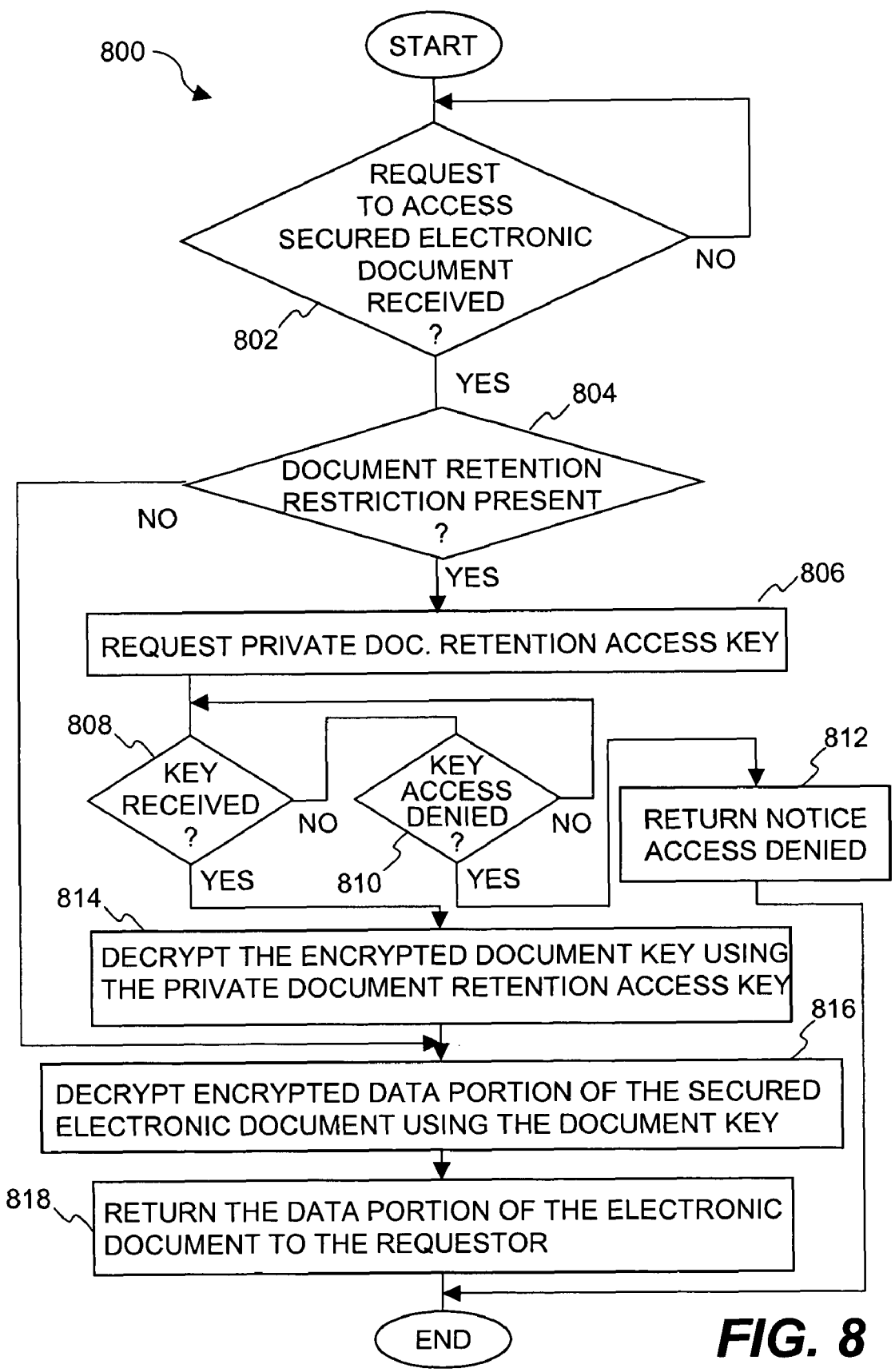
FIG. 8 is a flow diagram of a document unsecuring process according to one embodiment of the invention.

FIG. 8 is a flow diagram of a document unsecuring process 800 according to one embodiment of the invention. The document unsecuring process 800 can be performed at a client machine or a server machine, such as the user machine 108 or the access server 102 illustrated in FIG. 1.

The document unsecuring process 800 begins with a decision 802 that determines whether a request to access a secured electronic document has been received. When the decision 802 determines that a request to access a secured electronic document has not yet been received, the document unsecuring process 800 awaits such a request. In other words, the document unsecuring process 800 can be considered to be invoked once access to a secured electronic document is requested.

Once the decision 802 determines that a request to access a secured electronic document has been received, a decision 804 determines whether a document retention restriction is present. In one implementation, the decision 804 can evaluate a header portion of the secured electronic document to determine whether a document retention restriction is present. In another implementation, the decision 804 can evaluate a system policy to determine whether a document retention restriction is present. As an example, the header can include an indicator of a document retention restriction.

When the decision 804 determines that a document retention restriction is present, then a private document retention access key is requested 806. In one embodiment, the private document retention access key is requested 806 from a file security system, such as a server machine thereof (e.g., access server 102). Then, a decision 808 determines whether the requested key has been received. When the decision 808 determines that the requested key has not yet been received, a decision 810 determines whether access to the requested key has been denied. Typically, the private document retention access key is only available so long as a retention period for the secured electronic document has not been exceeded. In one embodiment, the access server 102 controls access to the private document retention access key which is stored in the key store 106. Hence, in such an embodiment, the access server 102 would deny any request for the document retention access key after the retention period has been exceeded. In another embodiment, the private document retention access key might be available locally at the user machines (e.g., such as when previously acquired from the access server 102). In such an embodiment, the private document retention access key would be deleted, overwritten or otherwise destroyed at the user machine and the access server 102. In any case, when the decision 810 determines that access to the requested key has been denied, then access to the secured electronic document is denied and notice that access has been denied is returned 812. In one embodiment, the notice can more specifically indicate that access is denied because the document has expired. Following the block 812, the document unsecuring process 800 ends with access to the secured electronic document being denied.

On the other hand, when the decision 810 determines that access to the requested key has not been denied, then the document unsecuring process 800 returns to repeat the decision 808 so as to wait for the requested key to be received. Once the decision 808 determines that the requested key (the private document retention access key) has been received, the encrypted document key from the secured electronic document is decrypted 814 using the private document retention access key to yield the document key (unencrypted). Here, in one embodiment, a header portion of the secured electronic document includes at least the encrypted document key (as well as the indicator for the private document retention access key). Next, an encrypted data portion of the secured electronic document is decrypted 816 using the document key. Finally, the data portion of the electronic document is then returned 818 to the requestor. Additionally, it should be noted that when the decision 804 determines that a document retention access restriction is not present, then the document unsecuring process 800 skips blocks 806-814 and proceeds to block 816. Following block 818, the document unsecuring process 800 ends with access to the secured electronic document being successful.

In one embodiment, to manage the number of key pairs, the document retention access keys (e.g., the public and private key pair) can be shared by electronic documents being retained for a like duration. For example, FIGS. 4F-4F illustrate that document retention keys can be shared for a month.

FIG. 9 shows a basic security system 900 in which the invention may be practiced in accordance with one embodiment thereof. The security system 900 may be employed in an enterprise or inter-enterprise environment. It includes a first server 906 (also referred to as a central server) providing centralized access management for the enterprise. The first server 906 can control restrictive access to files secured by the security system 900 as well as file (e.g., document) retention. To provide dependability, reliability and scalability of the system, one or more second servers 904 (also referred to as local servers, of which one is shown) may be employed to provide backup or distributed access management for users or client machines serviced locally. The server 904 is coupled to a network 908 and a network 910. For illustration purposes, there are two client machines 901 and 902 being serviced by the local server 904. Alternatively, one of the client machines 901 and 902 may be considered as a networked storage device.

Secured files may be stored in any one of the devices 901, 902, 904 and 906. When a user of the client machine 901 attempts to exchange a secured file with a remote destination 912 being used by an external user, the processes discussed above can be utilized to ensure that the requested secure file is delivered without compromising the security imposed on the secured file.

According to one embodiment, a created document is caused to go through an encryption process that is preferably transparent to a user. In other words, the created document is encrypted or decrypted under the authoring application so that the user is not aware of the process. One or more keys, such as a user key and a document retention access key, can be used to retrieve a file key to decrypt an encrypted document. Typically, the user key is associated with an access privilege for the user or a group of users, and the document retention access key is associated with a retention period imposed on the created document. For a given secured document, only a user with proper access privileges can access the secured document and then only after a time restriction, if present, is satisfied.

In one setting, a secured document may be uploaded via the network 910 from the client computer 901 to a computing or storage device 902 that may serve as a central repository. Although not necessary, the network 910 can provide a private link between the computer 901 and the computing or storage device 902. Such link may be provided by an internal network in an enterprise or a secured communication protocol (e.g., VPN and HTTPS) over a public network (e.g., the Internet). Alternatively, such link may simply be provided by a TCP/IP link. As such, secured documents on the computing or storage device 902 may be remotely accessed.

In another setting, the computer 901 and the computing or storage device 902 are inseparable, in which case the computing or storage device 902 may be a local store to retain secured documents or receive secured network resources (e.g., dynamic Web contents, results of a database query, or a live multimedia feed). Regardless of where the secured documents or secured resources are actually located, a user, with proper access privileges and within retention periods, can access the secured documents or resources from the client computer 901 or the computing or storage device 902 using an application (e.g., Microsoft Internet Explorer, Microsoft Word or Adobe Acrobat Reader).

Accordingly, respective local modules in local servers, in coordination with the central server, form a distributed mechanism to provide not only distributed access control enforcement but also file (e.g., document) retention. Such distributed access control enforcement ensures the dependability, reliability and scalability of centralized access control management undertaken by the central server for an entire enterprise or a business location.

FIG. 10 shows an exemplary data structure 1020 of a secured file that may be used in one embodiment of the invention. The data structure 1020 includes two portions: a header (or header portion) 1022 and encrypted data (or an encrypted data portion) 1024. The header 1022 can be generated in accordance with a security template associated with a data store and thus provides restrictive access to the data portion 1024 which, for example, is an encrypted version of a plain file. Optionally, the data structure 1020 may also include an error-checking portion 1025 that stores one or more error-checking codes, for example, a separate error-checking code for each block of encrypted data 1024. These error-checking codes may also be associated with a Cyclical Redundancy Check (CRC) for the header 1022 and/or the encrypted data 1024. The header 1022 includes a flag bit or signature 1027 and security information 1026 that is in accordance with the security template for the data store. According to one embodiment, the security information 1026 is encrypted and can be decrypted with a user key associated with an authenticated user (or requester).

The security information 1026 can vary depending upon implementation. However, as shown in FIG. 10, the security information 1026 includes a user identifier (ID) 1028, access policy (access rules) 1029, keys (cryptographic keys) 1030, and other information 1031. Although multiple user identifiers may be used, a user identifier 1028 is used to identify a user or a group that is permitted to access the secured file. The access rules 1029 provide restrictive access to the encrypted data portion 1024. The keys 1030 are cipher keys (and/or pointers or indentifiers therefor) that, once obtained, can be used to decrypt the encrypted data portion 1024 and thus, in general, are protected. In one implementation of the data structure 1020, at least one of the keys 1030 is encrypted in conjunction with the access rules 1029. In another implementation of the data structure 1020, at least one of the keys 1030 is a file retention access key or is a key encrypted with a file retention access key, either of which can possibly be further protected by the access rules 1029. The other information 1031 is an additional space for other information to be stored within the security information 1026. For example, the other information 1031 may be used to include other information facilitating secure access to the secured file, such as version number or author identifier.

The invention is preferably implemented by software or a combination of hardware and software, but can also be implemented in hardware. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The various embodiments, implementations and features of the invention noted above can be combined in various ways or used separately. Those skilled in the art will understand from the description that the invention can be equally applied to or used in various other settings with respect to different combinations, embodiments, implementations or features as provided in the description herein.

The advantages of the invention are numerous. Different embodiments or implementations may yield one or more of the following advantages. One advantage of the invention is that retention of electronic data (e.g., electronic documents) is provided in a robust, cryptographically secure manner. Another advantage of the invention is that retention of electronic data can be transparently enforced on distributed computers. Another advantage of the invention is that retention policies can managed with a limited number of keys. Still another advantage of the invention is that document retention can be imposed on off-line users.

The foregoing description of embodiments is illustrative of various aspects/embodiments of the present invention. Various modifications to the invention can be made to the preferred embodiments by those skilled in the art without departing from the true spirit and scope of the invention as defined by the appended claims. Accordingly, the scope of the present invention is defined by the appended claims rather than the foregoing description of embodiments.

What is claimed is:

1. A method of providing automated document retention for an electronic document comprising:
    assigning a document retention policy to the electronic document, the document retention policy being derived from a recurring cut-off retention schedule specifying cut-off periods, each cut-off period having a respective document retention duration associated therewith and corresponding to a respective maximum off-line period of a client, wherein the maximum off-line period expires a predetermined period of time after a beginning of its cut-off period;
    encrypting the electronic document using cryptographic keys associated with particular cut-off periods, associated retention durations, and corresponding maximum off-line periods, wherein the encrypting is based on the document retention policy such that the electronic document can be cryptographically accessed using the cryptographic keys during retention durations and prior to the expiration of the maximum off-line period of the client; and
    deactivating the cryptographic keys when the respective document retention duration has expired, thereby preventing further access to the electronic document.

2. The method as recited in claim 1, wherein
    encrypting the electronic document comprises encrypting using a cryptographic key associated with each particular cut-off period, its associated retention duration, and its corresponding maximum off-line period.

3. The method as recited in claim 2, wherein the document retention policy specifies the respective document retention duration that expires a predetermined period of time after a beginning of its respective cut-off period.

4. The method as recited in claim 1, wherein said encrypting comprises acquiring a cryptographic key from a server over a network, the cryptographic key being used to encrypt the electronic document based on the document retention policy.

5. The method as recited in claim 4, wherein:
    said encrypting uses a cryptographic key to encrypt the electronic document based on the document retention policy, and
    the document retention policy specifies respective document retention durations and cut-off periods.

6. The method as recited in claim 5, wherein the document retention policy specifies the respective document retention duration that expires a predetermined period of time after a beginning of its respective cut-off period.

7. A method of limiting access to an electronic document comprising:
    associating a document retention policy with a first document retention key, wherein the document retention policy specifies a document retention duration that expires a predetermined period of time after a beginning of a cut-off period of a recurring cut-off retention schedule;
    determining whether the cut-off period for the first document retention key has elapsed;
    generating a next document retention key to be used to encrypt the electronic document during a next cut-off period, the next document retention key having a document retention duration associated therewith and corresponding to a maximum off-line period of a client; and
    notifying the client of the next document retention key, the electronic document being cryptographically accessible only during document retention durations and prior to the expiration of the maximum off-line period of the client using a cryptographic key associated with particular cut-off periods, associated retention durations, and corresponding maximum off-line periods.

8. The method as recited in claim 7, further comprising:
    deactivating a cryptographic key according to a predetermined schedule.

9. The method as recited in claim 8, wherein the document retention duration is a predetermined duration of time following a beginning of the next cut-off period.

10. A method for restricting access to an electronic document, said method comprising:
    assigning a document retention policy to the electronic document, the document retention policy specifying a document retention duration that expires a predetermined period of time after a beginning of a cut-off period of a recurring cut-off retention schedule;

encrypting a data portion of the electronic document using a document key to produce an encrypted data portion;

using a retention access key to associate the document retention policy with the electronic document;

encrypting the document key using the retention access key to produce an encrypted document key, the retention access key being usable for said encrypting during the cut-off period of a recurring cut-off retention schedule, the cut-off period having a document retention duration associated therewith and corresponding to a maximum off-line period of a client, wherein the maximum off-line period expires a predetermined period of time after a beginning of the cut-off period;

forming a secured electronic document from at least the encrypted data portion and the encrypted document key; and storing the secured electronic document, the secured electronic document being cryptographically accessible only during the document retention duration and prior to the expiration of the maximum off-line period of the client.

11. The method as recited in claim 10, wherein the retention access key is a public retention access key.

12. The method as recited in claim 10, wherein access is restricted to the secured electronic document stored to a remote location.

13. A method for accessing a secured electronic document, the secured electronic document having at least a header portion and a data portion, comprising:

assigning a document retention policy to the electronic document;

obtaining a retention access key, the retention access key being used to associate a document retention duration of the document retention policy having a cut-off period and a maximum off-line period of a client associated therewith the secured electronic document, wherein the maximum off-line period expires a predetermined period of time after a beginning of the cut-off period, the retention access key being usable during the document retention duration following a beginning of its respective cut-off period of a recurring cut-off retention schedule, the secured electronic document being cryptographically accessible only during the document retention duration and prior to the expiration of the maximum off-line period of the client;

obtaining an encrypted document key from the header portion of the secured electronic document;

decrypting the encrypted document key using the retention access key to produce a document key; and decrypting an encrypted data portion of the secured electronic document using the document key to produce a data portion.

14. The method as recited in claim 13, wherein the retention access key is identified by an indicator within a header portion of the secured electronic document.

15. The method as recited in claim 13, wherein the retention access key is a private retention access key.

16. The method as recited in claim 13, wherein said obtaining obtains the retention access key from a server.

17. The method as recited in claim 13, wherein the document retention duration is a predetermined period of time following a beginning of its respective cut-off period.

18. A tangible computer-readable medium having instructions stored thereon, the instructions comprising:

instructions to assign a document retention policy to an electronic document, the document retention policy being derived from a recurring cut-off retention schedule specifying cut-off periods, each cut-off period having a respective document retention duration associated therewith and corresponding to a respective maximum off-line period of a client, wherein the maximum off-line period expires a predetermined period of time after a beginning of its cut-off period; and instructions to encrypt the electronic document using cryptographic keys associated with particular cut-off periods, associated retention durations, and corresponding maximum off-line periods, wherein the encrypting is based on the document retention policy such that the electronic document can be cryptographically accessed using the cryptographic keys during retention durations and prior to the expiration of the maximum off-line period of the client.

19. The tangible computer-readable medium as recited in claim 18, wherein the instructions to encrypt the electric document comprise instructions to use a cryptographic key associated with particular cut-off period, its associated retention duration, and its corresponding maximum off-line period.

20. The tangible computer-readable medium as recited in claim 19, wherein the document retention policy specifies the respective document retention duration that expires a predetermined period of time after a beginning of its respective cut-off period.

21. A file security system for restricting access to an electronic file, comprising:

a computing device;

a module which if executed by the computing device, causes the computing device to store a plurality of cryptographic key pairs on a computer-readable storage medium, each of the cryptographic key pairs including a public key and a private key, at least one of the cryptographic key pairs pertaining to a retention policy, the retention policy having document retention durations, each document retention duration having a respective cut off period associated therewith and corresponding to a respective maximum off-line period of a client, wherein the maximum off-line period expires a predetermined period of time after a beginning of its cut-off period; and an access control management module which if executed by the computing device, causes the computing device to:

provide, for each particular cut-off period, a different one of the public keys of the at least one of the cryptographic key pairs, and determine whether the private key of the at least one of the cryptographic key pairs pertaining to the retention policy is permitted to be provided to a requestor based on whether its respective document retention duration following a beginning of its respective cut-off period has expired, wherein the requestor requires the private key of the at least one of the cryptographic key pairs pertaining to the retention policy to access a secured electronic file, and wherein the secured electronic file was previously secured using the public key of the at least one of the cryptographic key pairs pertaining to the retention policy, and at the time the electronic file was secured, the public key was within its respective cut-off period and available for use, the secured electronic document being cryptographically accessible only during the retention durations and prior to the expiration of the maximum off-line period of the client.

* * * * *